United States Patent

Wilkins et al.

Patent Number: 6,158,716
Date of Patent: Dec. 12, 2000

[54] LATERAL CONNECTOR FOR TUBE ASSEMBLY

[75] Inventors: Robert Lee Wilkins; Steven Dwayne Gullion, both of Houston; Charles Edward Jones, Humble, all of Tex.

[73] Assignee: Kvaerner Oilfield Products, Houston, Tex.

[21] Appl. No.: 08/726,027

[22] Filed: Oct. 4, 1996

Related U.S. Application Data

[62] Division of application No. 08/361,357, Dec. 21, 1994, Pat. No. 5,582,438.

[51] Int. Cl.[7] .................................................... F16L 29/00
[52] U.S. Cl. ..................... 251/149.6; 251/251; 251/257; 285/314
[58] Field of Search ................................. 251/149.6, 251, 251/253, 263, 359, 257; 285/314

[56] References Cited

U.S. PATENT DOCUMENTS

| | | |
|---|---|---|
| 3,739,846 | 6/1973 | Beson . |
| 3,965,977 | 6/1976 | Beson . |
| 4,212,333 | 7/1980 | Randolph .......................... 251/149.6 X |
| 4,703,774 | 11/1987 | Seehausen . |
| 4,709,725 | 12/1987 | Morrison . |
| 4,796,922 | 1/1989 | Prichard . |
| 4,842,013 | 6/1989 | Rice et al. ........................... 251/263 X |
| 4,852,611 | 8/1989 | Knerr et al. . |
| 5,311,899 | 5/1994 | Isayama et al. .................. 251/149.6 X |

FOREIGN PATENT DOCUMENTS 1707384   1/1992   U.S.S.R. ................................ 251/359

*Primary Examiner*—Kevin Lee
*Attorney, Agent, or Firm*—Wendy Buskop; Bayko Gibson et al.

[57] ABSTRACT

A coupling element having two ends, and outer surface and a longitudinal axis extending between the ends, wherein the first end of the coupling element defines a sealing surface where extends normally to the longitudinal axis and the outer surface of the other end defines a cam follower surface forming an angle on the range of from about 2 to about 10 degrees with respect to the longitudinal axis and wherein the second end defines the cam follower surface and the coupling element defines a passage extending from the sealing surface to the outer surface and apparatus comprising the coupling element and valve elements.

12 Claims, 15 Drawing Sheets

LATERAL CONNECTOR FOR TUBE ASSEMBLY

This application is a divisional of Ser. No. 08/361,357 filed Dec. 21, 1994 now U.S. Pat. No. 5,582,438, issued Dec. 10, 1996.

BACKGROUND OF THE INVENTION

This invention relates to sealing lateral connections in tubular goods. In one aspect, the invention relates to sealing lateral connections in oilfield tubular goods.

Oilfield wells and wellheads have a characteristic architecture or arrangement. Wells and wellheads have a central vertical axis of rotational symmetry. Installation & manipulation are by vertical axis displacement and/or vertical axis rotation. Cylindrical body members are typical. Concentric nesting of cylindrical body members is also typical. Installation sequence of body members progresses from larger diameter to smaller diameter. In the last analysis, a schematic representation of a wellhead arrangement would suggest stacked cups.

The present invention addresses a need arising from this characteristic arrangement. Other devices or systems may share the same characteristic arrangement and might share in the benefit of the present invention.

The upper end of the wellhead system is closed by any one of a number of devices, providing control of fluid flow and pressure entering and/or leaving the well. This closure device is typically installed vertically, as a cap attached to the end of one of the wellhead's concentric body cylinders, and sealing fluid pressure at the upper end of one or more of the body cylinders.

A basic function of a wellhead system is to provide for fluid flow into the well and/or out of the well. The outer end of the required pathway(s) is outside of the outermost well barrier. The inner end of the pathway(s) is either the wellbore or one of the annular spaces between the concentric tubes or tubular bodies.

The basic flow in the pathway(s) is that of produced (or injected) fluids. This may include flow of well fluids which enter (or are introduced into) the annular spaces in the system.

A second, but critical flow is that of pressurized fluids used to control or operate devices in the well, such as downhole valves.

A less obvious need is the communication of non-fluid flow. Here a fluid-tight pathway is used to allow passage of a cable, for electrical or even optical signals. Here a fluid-tight path is required to exclude fluid rather than to contain it.

Examples of wellhead pathway connections are many. These include a concentric vertical stab using a conventional single completion tubing bonnet (wing outlet above master valve); an eccentric vertical stab using a dual, orienting tubing hanger and bonnet; a storm choke or SCSSV control stab; a control system such as the Knerr et al control stab ring, the Seehausen control connector, or NL control connections. Also included are these: concentric control line galleries on a side valve tree tubing hanger; an eccentric side penetrator (such as the Blizzard BOP tree control connector); or the Vetco shearable stinger.

Vertical connection of pathways is the most basic, typical approach. Its main advantage is that it relates well to the sequential "stack-up" of the system components. Also, it agrees with the installation motion, vertical displacement. Its disadvantages include these: that it requires rotational orientation around the well axis if the path is not concentric; it adds vertical stack-up height, and component subassemblies, to accommodate connection(s) and seals; it limits the number and size of connections into an annulus by its boundary diameters.

Horizontal (radial) connection of pathways requires no rotational orientation to the well axis if gallery seals are used. However, if a horizontal connection (penetrator) crosses over a diameter interface between two concentric bodies of the wellhead assembly, it "locks" those bodies together and vertical displacement or removal of the inner from the outer body is prevented. Traditional "stab" connections (male/female) embody this disadvantage when configured in the horizontal orientation.

At the top of a completed wellhead system there is a tubing hanger installed in a tubing spool (or tubing bowl). Above this a bonnet provides a transition and interface to the bottom connection of a Christmas tree.

In an arrangement of tubing hanger and tubing spool, regardless of which configuration, there are basic boundary penetration requirements. All may be viewed as candidates for adaptation to horizontal penetration/connection. The boundary penetrations are these:

1. pressurized control fluid; this operates downhole valves, or other devices;
2. annulus fluid (casing tubing annulus); this may be at pressure or not, flowing or not, and may be "inbound" or "outbound";
3. production fluid; again, this may be at pressure or not, flowing or not, and may be "inbound" or "outbound";
4. electric current; this may be low voltage and current, transmitting a signal to/from a downhole sensor or device. Alternatively this may be a high voltage and current transmitting power to a downhole device (usually a pump).

In typical tubing hanger arrangements penetrations for pressurized fluid, including control fluid, have used a variety of designs. There are vertical, eccentric stabs (bonnet to hanger), as well as vertical, concentric connections (gallery seals, bonnet to hanger). Vertical connections may require orientation, and utilize space inefficiently. Gallery seals, when used, add problems of leak paths and interflow.

Recently, horizontal fluid connections with push/pull stab connections have been proposed. In these systems the hanger, including its side facing female receptacles, is rotationally oriented to the spool. The spool carries side facing male stabs, moved in/out radially by independent actuators (generally, hydraulic with/without spring bias). The system requires orientation of the hanger in the spool.

Furthermore, as noted above, the horizontal stab system has as a potential failure mode the locking of the hanger in the spool if the stab fails to retract. In the commercial system it has been proposed to deal with this failure mode by providing a weak point in the stab, corresponding to the point at which it bridges the cylindrical interface diameter between the hanger and the spool. In this way, failure to retract the stab can be overcome by forcibly withdrawing the hanger from the spool. In this action the stab will be sheared at its weak point. This allows for emergency recovery of the hanger, but leaves open the question of repairing the stab.

Typical electrical connections/penetrations have used vertical male/female stabs, requiring orientation and alignment. Reliability of these items is a concern, and access to either half of the connection is limited, limiting effective maintenance and repair.

SUMMARY OF THE INVENTION

In one embodiment of the invention, there is provided a tubular assembly having a lateral connection. The assembly comprises a tubular member, a carrier ring, a coupling element, and an urging means. The tubular member has a generally cylindrical inside surface, an outside surface, and a longitudinal axis. The carrier ring has a generally cylindrical inside surface, a generally cylindrical outside surface, and a longitudinal axis. The carrier ring is positioned coaxially in the tubular member with the outside surface of the carrier ring positioned adjacent to the inside surface of the tubular member. The coupling element is carried by the carrier ring. The coupling element has a longitudinal axis which is generally radially positioned with respect to the longitudinal axis of the carrier ring. The coupling element has an inner end and an outer end. The outer end has a sealing face. A means defining a sealing face is provided on the inside surface of the tubular member. The sealing face of the coupling element sealing engages the sealing face defined by the means on the inside surface of the tubular member. A means is provided for urging the sealing face of the coupling element and the sealing face defined by the means on the tubular member together responsive to relative longitudinal movement between the means for urging and the tubular member.

In another embodiment of the invention, there is provided a modular unit which can be used to establish a lateral connection through the sidewall of a tubular member positioned around it. The modular unit comprises a carrier ring, a coupling element, a carrier body, and a radial movement means. The carrier ring has a generally cylindrical inside surface and a generally cylindrical outside surface. A coupling element is carried by the carrier ring. The coupling element has a longitudinal axis which is generally radially positioned with respect to the longitudinal axis of the carrier ring. The coupling element has an inner end and an outer end and the outer end has a sealing face. A carrier body having a generally cylindrical outside surface is positioned coaxially inside of the carrier ring. The generally cylindrical outside surface of the carrier body is adjacent to the generally cylindrical inside surface of the carrier ring. A means is provided for radially moving the coupling element in the carrier ring responsive to relative longitudinal movement between the carrier ring and the carrier body.

According to another embodiment of the invention, there is provided a method for establishing a line connection across a first tubular member sidewall. A carrier ring is provided which is concentrically positioned in the first tubular member. An annulus is defined between the carrier ring and the first tubular member. A line coupling element is carried by the carrier ring. The line coupling element has a longitudinal axis which is generally radially directed with respect to a longitudinal axis of the carrier ring. The line coupling element having an outer end which defines a first sealing face. A means is provided for defining a generally radially extending passage through the sidewall of the first tubular member with a second sealing face being defined at an inner end of the passage. The second sealing face is for sealingly contacting a respective first sealing face of the coupling element. A means is provided for urging the sealing face of the first coupling element and the sealing face at the inner end of the passage together in response to relative longitudinal movement between the first tubular member and the means for urging.

In other aspects of the invention, there is provided a new coupling element for connecting lines, a new carrier ring for carrying the coupling element, a new carrier body for carrying the carrier ring, a new sliding actuator cam for actuating the coupling element, a new detent for actuating the sliding actuator cam, and a new retractor for retracting the coupling element, as well as new cooperation between the various structural elements.

Horizontal, non-concentric penetrations offers several advantages to the designer.
1. reduced interflow risk
2. multiple radial connections on the same horizontal plane, saving stack-up height
3. simplified bonnet/tree cap
4. readier vertical access to the inner body (tubing hanger)
5. reduced risk of damage to seal surfaces in the spool, vertical scratching incurred in installation/removal of the inner body.

It is also apparent that the use of prior art horizontal, non-concentric penetrator offers at least these two disadvantages:
1. failure to retract a stab may result in the need to shear out the stab body
2. a push/pull mechanism is built into the tree spool; this adds complexity and failure modes to the item you wish to leave undisturbed.

The present invention provides a horizontal penetration which addresses these two disadvantages "head-on".

First, this invention is designed to effect a face/face shear seal across the cylindrical interface.

Use of a shear seal arrangement offers a number of advantages. Most important and obvious is the advantage that the connection is separated by lateral, shearing motion. In this application, that is the "motion of choice" in the installation and removal of the hanger from the spool.

Second, the invention provides a limited radial push/pull actuation by a novel mechanism on the inner (tubing hanger) body. This places the mechanism on the preferred assembly for recovery and maintenance.

In addition, the use of a radial actuation, even a small one offers other advantages:
1. The shear seal interface is beneficially planar while the interface here is cylindrical. Use of the small radial displacement allows installation of the inner (hangar) body with an unobstructed cylindrical space.
2. Potential for damage to seal surfaces on installation and removal is reduced.
3. Positive energizing of the face seal is achieved.
4. Use of a metal seal is facilitated, because of the actuation.

BRIEF DESCRIPTION OF THE DRAWINGS

The present invention will now be described, by way of example, with reference to the accompanying drawings in which.

DETAILED DESCRIPTION OF THE PREFERRED EMBODIMENTS

Overview

Figure 1:
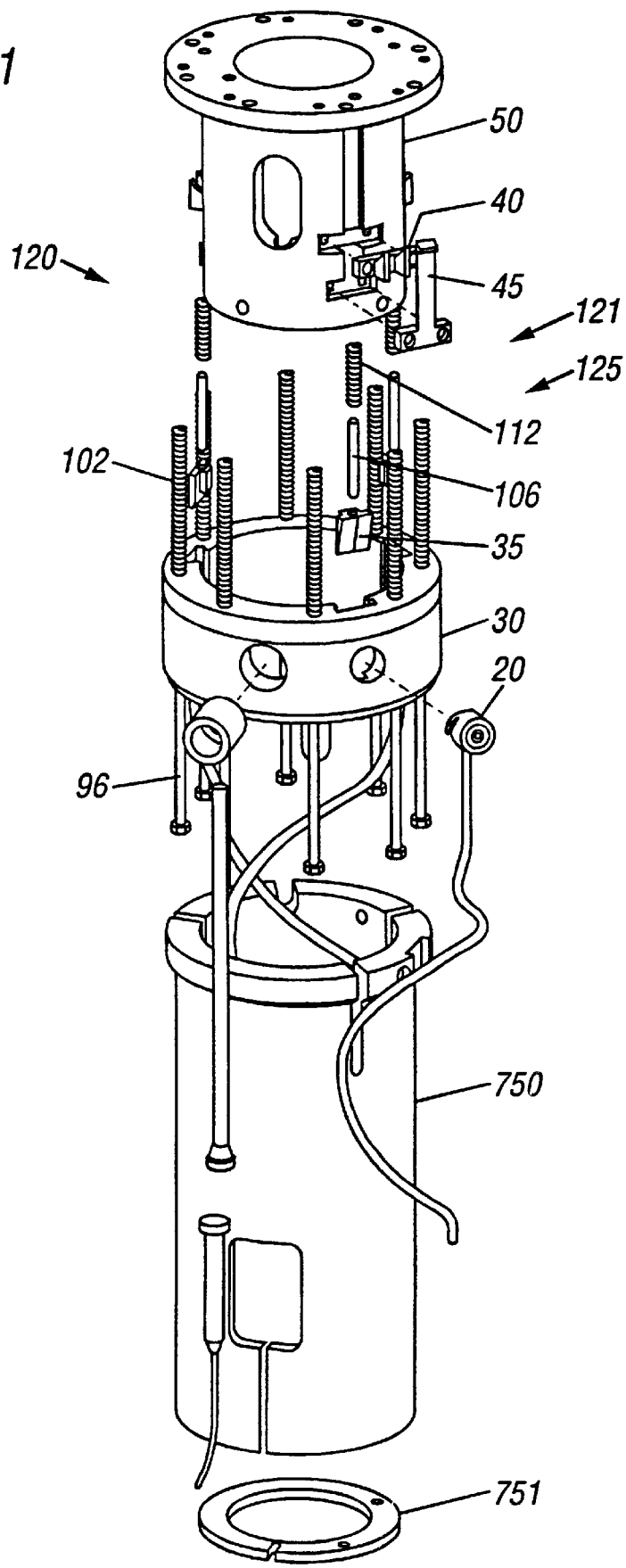
FIG. 1 is an exploded perspective view of the subject invention.
Figure 14:
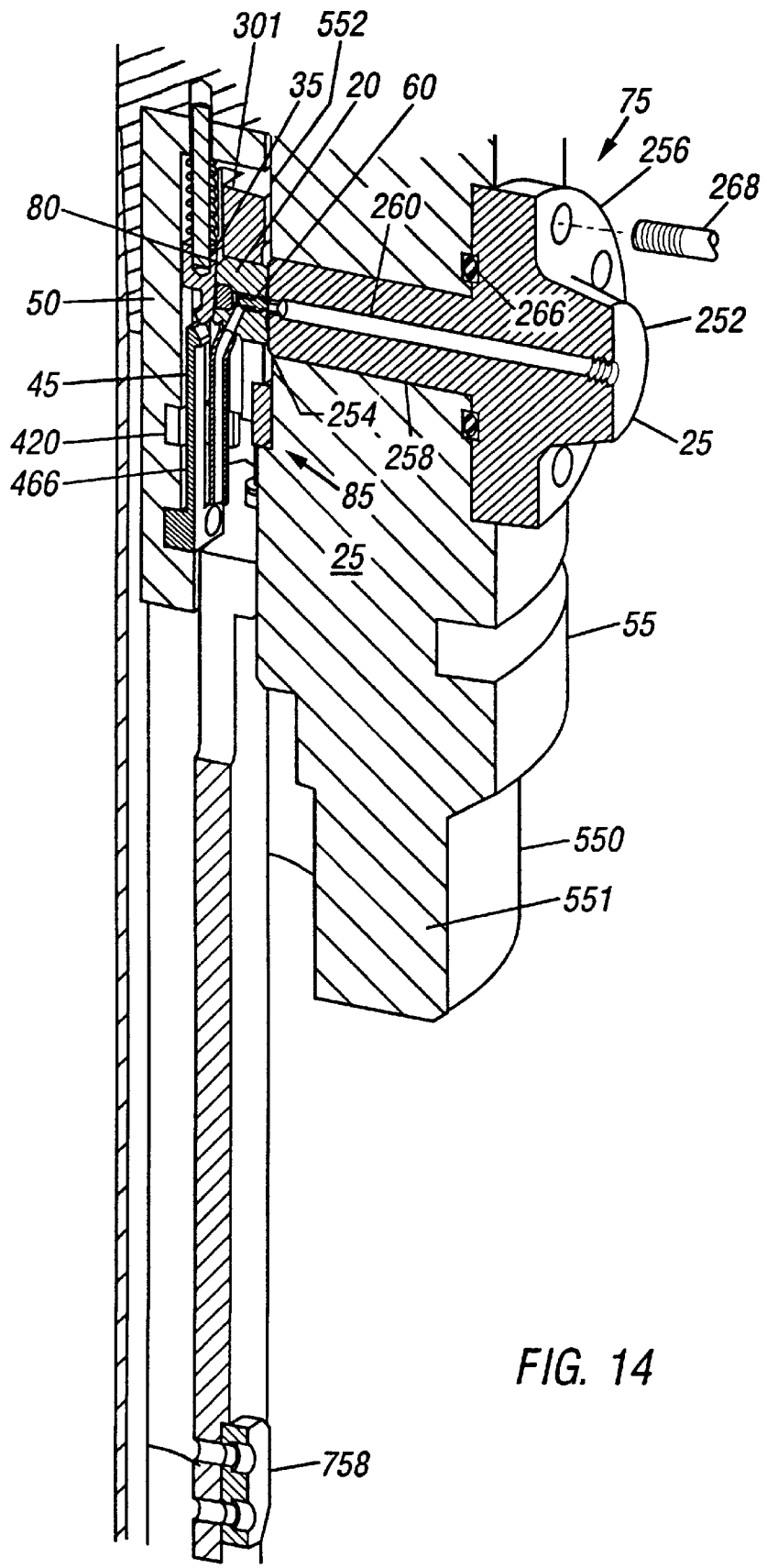
FIG. 14 is a section similar to FIG. 13, but on a different scale.

With reference to FIGS. 1 and 14, a preferred embodiment of the invention comprises a first coupling element 20, sometimes referred to as a penetrator, a second coupling element 25, sometimes referred to as the outer coupling, a carrier ring 30, a sliding actuator cam 35, sometimes referred to as a wedge, a retractor cam 40, sometimes referred to as a retractor fork, a pawl 45, sometimes referred to as a detent, a carrier body 50, a spool body 55, and a poppet valve 60.

Penetrator

One of the characterizing features of the invention is that at least one movable penetrator 20 is used. It may be carried on either the carrier ring 30 or the spool body 55. The radial movement of the penetrators provides for ample radial clearance between the carrier ring and the spool body to prevent damage to the seal faces.

The penetrator may be cylindrical or otherwise. Use of a large lateral clearance and small vertical clearance between the penetrator and its "port" in the carrier body gives advantageous limits on self alignment. This favors use of a rectangular, or even oval cross-section for the penetrator, by allowing a tight vertical fit to the carrier ring (top/bottom), and a loose(r) lateral fit (side/side). The cylindrical penetrator provides an equal fit all around, but is preferred on the basis of manufacturing simplicity.

The penetrator is capable of mating a face/face electrical connection as well as a fluid tight connection.

Figure 2:
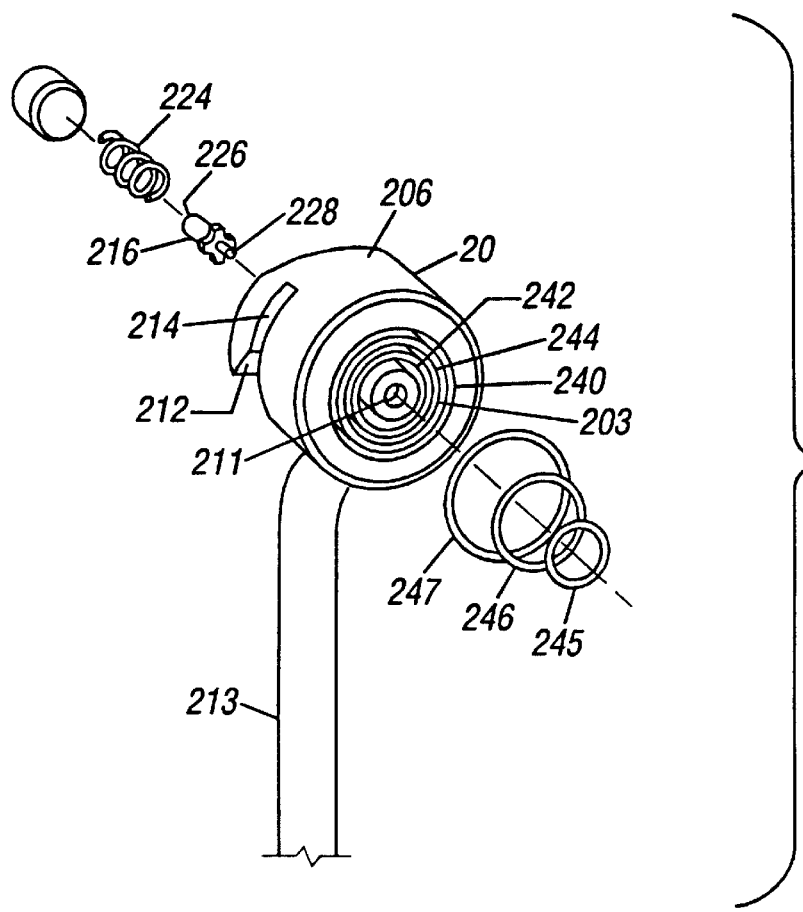
FIG. 2 is an exploded perspective view of a penetrator according to the present invention.
Figure 3:
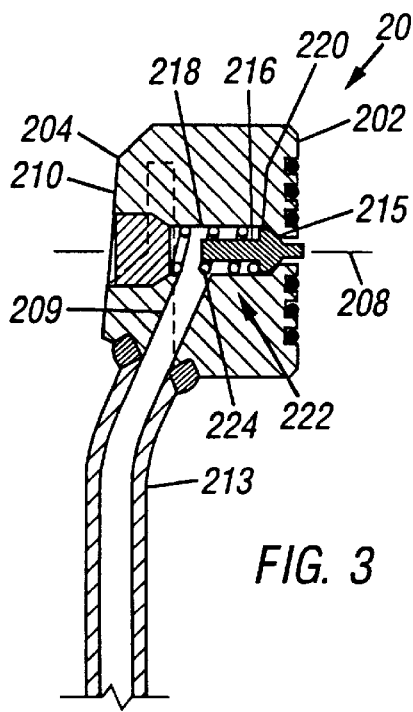
FIG. 3 is a longitudinal section through the penetrator of FIG. 2.
Figure 4:
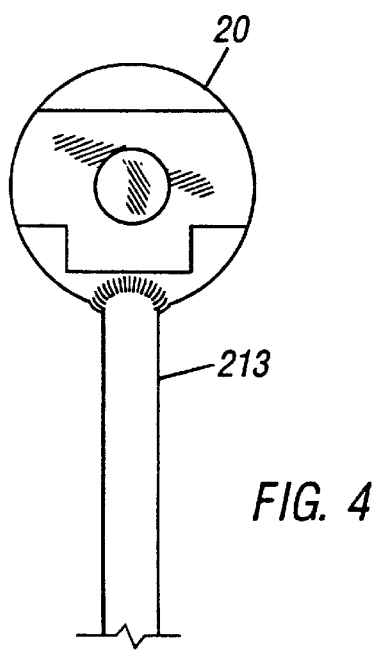
FIG. 4 is a rear elevation of the penetrator of FIGS. 2 and 3.

With reference to FIGS. 2–4, the coupling element 20 has a first end 202, a second end 204, and outer surface 206, and a longitudinal axis 208 extending between the first end and the second end. The first end 202 forms a sealing surface 203 which extends generally normally to the longitudinal axis 208. The outer surface 206 forms a cam follower surface 210 forming an angle in the range of from about 80 degrees to about 88 degrees with respect to the longitudinal axis. Preferably, the cam follower surface 210 is defined by a portion of the outer surface 206 at or near the second end 204. The coupling element 20 defines a passage 209 extending from the sealing surface 203 to the outer surface 206. Preferably, the passage 209 extends from the sealing surface 203 to a side surface of the coupling element. A tubing line 213 is connected to the passage 209 where it opens onto the side surface. As shown in FIG. 1, the tubing line is coiled to permit movement during installation and use. The tubing has an upper end and a lower end. It is attached by its upper end to the coupling element 20 and by its lower end to a bulkhead 751 attached to the lower end of orientation sleeve 750. See FIG. 1.

In a preferred embodiment of the invention, the outer surface 206 further defines at least one second cam follower surface 212 generally forming an angle in the range of about 10 degrees to about 45 degrees with respect to the longitudinal axis. For ease of fabrication, it is preferred that the outer surface 206 be generally cylindrically shaped with a generally circumferentially extending groove 214 and the at least one second cam follower surface 212 is formed by a wall of the groove.

In one embodiment of the invention, the coupling element 20 has a valve seat 215 positioned in the passage 209 adjacent to the sealing surface 203. The valve seat 215 faces away from the sealing surface 203. The coupling element 20 further comprises a valve element 216 positioned in a generally longitudinally extending portion 218 of the passage 209 adjacent to the sealing surface 203. The valve element 216 has a valve face 220 to sealingly contact the valve seat 215. A means 222 is provided in the passage 209 for biasing the valve element 216 toward the valve seat 215.

Preferably, the valve element 216 has a first end 226 and a second end 228 and the valve face 220 is positioned between the first end and the second end. The second end 228 of the valve element protrudes from the first end 202 of the coupling element 20 when the valve face 220 of the valve element 216 is in sealing contact with the valve seat 215. See FIG. 3.

A plurality of grooves 240, 242 and 244 are preferably defined on the sealing surface 203 concentrically spaced around an inlet end 211 of the passage 209. At least one seal element, preferably a plurality of seal elements 245, 246 and 247 are positioned in the plurality of concentrically spaced grooves, one seal element per groove. It is contemplated that metallic C rings will provide good results when used as the seal elements, optionally in combination with O ring seals.

Outer Coupling

Active or passive radial displacement could be built into the outer seal member (static in the preferred embodiment). This could be in place of or in addition to the displacement of the penetrators.

The contact face on the outer cylinder may be formed on a removable body. This allows for easier manufacture (of the flat face). It also allows use of a different material from that of the cylinder. It allows use of hardfacing processes. It allows access for remote servicing of the inner penetrator by removing the outer body.

With reference to FIG. 14, the coupling element 25 has a first end 252 and a second end 254. The coupling element has a flange 256 positioned near the first end 252 and a generally cylindrical nose-piece 258 protruding from a face of the flange. The coupling element 25 forms a passage 260 extending from the first end 252 to the second end 254. A land 262 (see FIG. 15) is defined by the second end of the coupling element. In a preferred embodiment, the passage 260 is partially closed at the second end 254 of the coupling 25. The passage is divided into a plurality of openings 264 at the second end of the coupling element. The openings are preferably positioned in a generally annular pattern with the land 262 being centrally located. The coupling element can be bolted to the sidewall of the spool body 55 using a plurality of bolts 268 to form a flow passage across the sidewall of the spool body. Preferably, a seal 266 is provided between the coupling element and the wall of the spool body. A BX seal is expected to provide good results when positioned in the vertical plane between the coupling 25 and the spool body 55.

Carrier Ring

Figure 10:
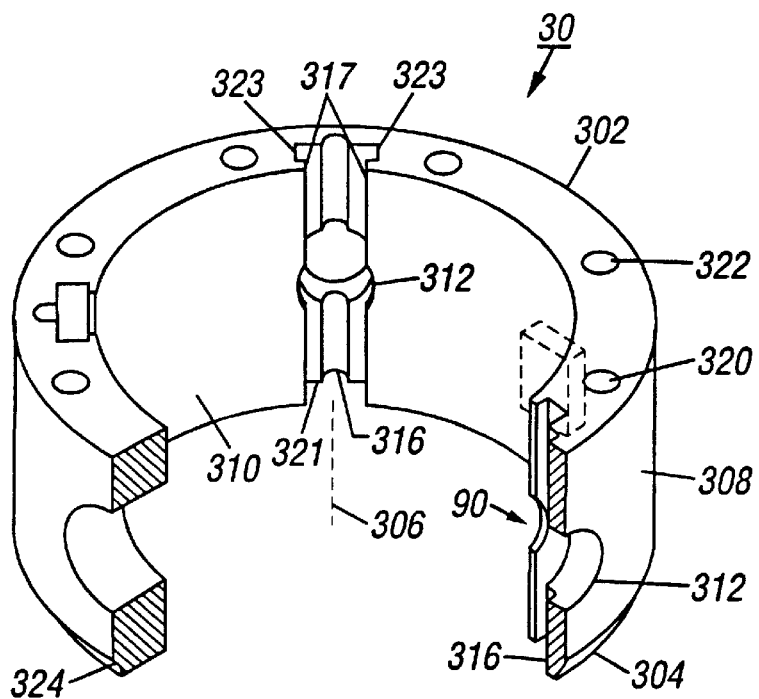
FIG. 10 is a perspective view, partially broken away, of the carrier ring of the present invention.

With reference to FIG. 10, the carrier ring 30 has a first end 302, a second end 304, and a longitudinal axis 306. A generally cylindrical outer surface 308 is positioned about the longitudinal axis and a generally cylindrical inner surface 310 is positioned concentrically with the outer surface 308. The carrier ring 30 defines a plurality of generally radially extending boreholes 312 leading from the outer surface 308 to the inner surface 310 and a plurality of slots 316 extending longitudinally along the generally cylindrical inner surface 310. The slots extend from the first end 302 to the second end 304 of the carrier ring 30 and connect with the boreholes 312, one slot per borehole. The plurality of generally longitudinally extending slots 316 are preferably each defined by a pair of sidewall surfaces 317 and a bottom wall surface 321. Each sidewall surface preferably further defines a generally longitudinally extending groove 323.

The carrier ring 30 preferably further defines a plurality of generally longitudinally extending boreholes 320 extending from the first end 302 to the second end 304. The generally longitudinally extending boreholes 320 are spaced circumferentially apart from the generally radially extending boreholes 312.

It is further preferred that the generally cylindrical outer surface 308 of the carrier ring 30 further defines a generally frustroconically shaped shoulder 324 near the second end 304. The generally frustroconically shaped shoulder 324 tapers toward the second end 304 of the carrier ring 30. If desired, a wiper seal not shown, can be positioned between the borehole 312 and the second end 304 to clean the face of the outer coupling when the unit is lowered into position.

Wedge

Figure 7:
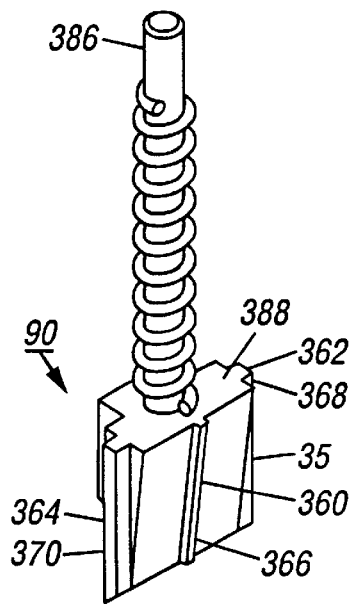
FIG. 7 is a perspective view of a sliding actuator cam or wedge used in the present invention.
Figure 8:
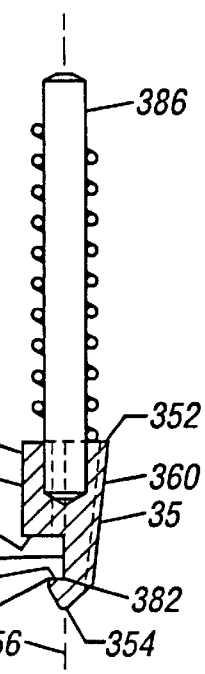
FIG. 8 is a side elevation, partially in section, of the cam or wedge shown in FIG. 7.

With reference to FIGS. 7 and 8, the sliding actuator cam 35 has a first end 352, a second end 354, and a longitudinal axis 356 extending between the first end and the second end. The cam 35 has a first side surface 358 positioned generally parallel to the longitudinal axis 356 and a generally planar cam surface 360 on an opposite side of the cam 35 from the first side surface. The generally planar cam surface 360 extends at an angle in the range of about 2 degrees to about 10 degrees with respect to the longitudinal axis 356. The cam 35 tapers from the first end 352 to the second end 354.

The sliding actuator cam 35 preferably further has a first edge surface 362 and a second edge surface 364 positioned generally parallel to the longitudinal axis 356 and generally normal to the first side surface 358. The sliding actuator cam 35 preferably is also provided with ribs. A rib 366 extends generally longitudinally along the generally planar cam surface 360. This rib is preferably centrally located and, when present, forms the camming surface. A rib 368 extends generally longitudinally along the first generally planar edge surface 362. A rib 370 extends generally longitudinally along the second generally planar edge surface The first side surface 358 preferably further defines a step down 372 positioned between the first end 352 and the second end 354 of the cam 35. The step down 372 is from a generally planar portion 376 of the first side surface 358 and faces the second end of the cam 35. The cam 35 preferably also defines a step up which faces the first end 352 of the cam 35 and forms a shoulder 374 positioned between the step down 372 and the second end 354. A lateral or channel groove 380 is thus formed between the step down 372 and the shoulder 374. The shoulder 374 has an inner end 382 and an outer end 384. The outer end of the shoulder is spaced between the plane of the generally planar portion 376 of the first side surface and the plane of the generally planar cam surface 360. Preferably, the shoulder 374 is generally planar and forms an angle in the range of from about 80 degrees to about 88 degrees with respect to the longitudinal axis 356 of the cam 35.

In a preferred embodiment, a shaft 386 extends generally longitudinally from a first end surface 388 of the cam 35.

Alternate Wedge

Figure 21:
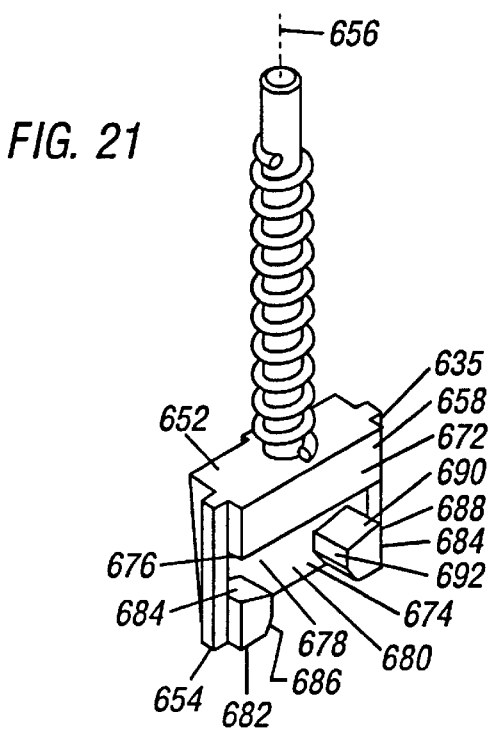
FIG. 21 is a perspective view of an alternative version of the element of the invention shown in FIG. 7.
Figure 20:
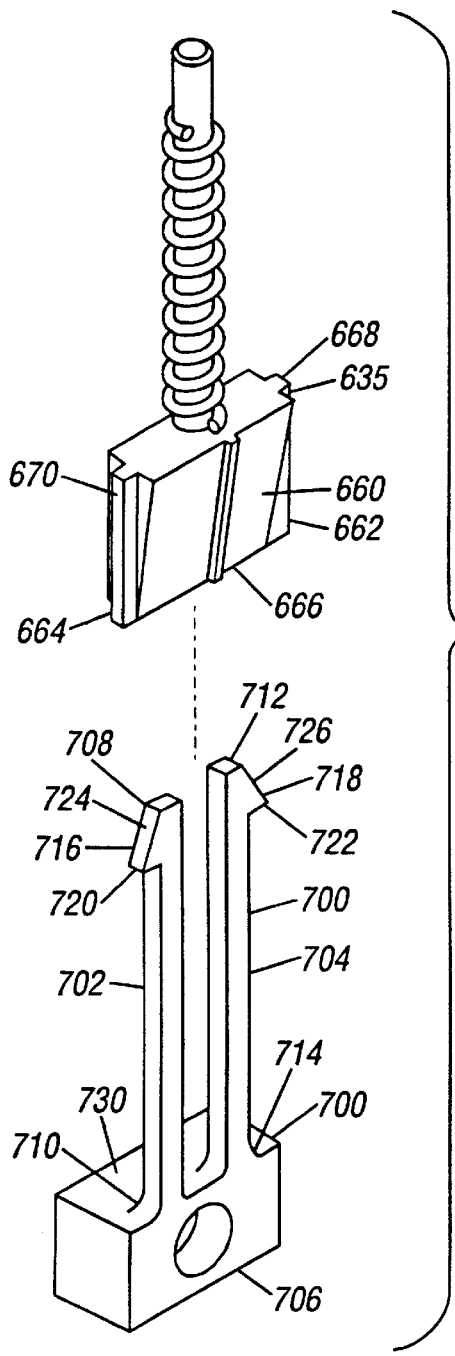
FIG. 20 is a perspective view an alternative version of the elements of the invention shown in FIGS. 7 and 5.

An alternate and presently preferred embodiment of the wedge is described with reference to FIGS. 20 and 21. The sliding actuator cam 635 has a first end 652, a second end 654, and a longitudinal axis 656 extending between the first end and the second end. The cam 635 has a first side surface 658 positioned generally parallel to the longitudinal axis 656 and a generally planar cam surface 660 on an opposite side of the cam 635 from the first side surface. The generally planar cam surface 660 extends at an angle in the range of about 2 degrees to about 10 degrees with respect to the longitudinal axis 656. The cam 635 tapers from the first end 652 to the second end 654.

The sliding actuator cam 635 preferably further has a first edge surface 662 and a second edge surface 664 positioned generally parallel to the longitudinal axis 656 and generally normal to the first side surface 658. The sliding actuator cam 635 preferably is also provided with ribs. A rib 666 extends generally longitudinally along the generally planar cam surface 660. A rib 668 extends generally longitudinally along the first generally planar edge surface 662. A rib 670 extends generally longitudinally along the second generally planar edge surface 664. The ribs serve the same function as in the cam 35.

The first side surface 658 further has an upper generally planar portion 672 and a lower generally planar portion 674 positioned between the upper planar portion 672 and the second end 652 of the sliding actuator cam 635. A step down 676 is defined between the upper planar portion 672 and the lower planar portion 674. The lower planar portion 674 is defined by a bottom wall of a lateral trough 678 extending across the first side surface and the bottom wall of a longitudinal trough 680 extending from the second end 654 of the sliding actuator cam 635. The longitudinal trough connects with the lateral trough. The step down 676 defines a first sidewall of the lateral trough.

A first boss 682 protrudes from the lower planar portion 674. The first boss 682 has a first sidewall 684 defining a second sidewall of the lateral trough 678 and a second sidewall 686 defining a first sidewall of the longitudinal trough 680. A second boss 688 protrudes from the lower planar portion 674 at a position laterally spaced apart from the first boss 682. The second boss has a first sidewall 690 defining a third sidewall of the lateral trough 678 and a second sidewall 692 defining a second sidewall of the longitudinal trough 680. Preferably, the second sidewall of the lateral trough and the third sidewall of the lateral trough 678 converge toward the second end 654 of the sliding actuator cam 635 and the first sidewall of the longitudinal trough 680 and the second sidewall of the longitudinal trough converge toward the first end 652 of the sliding actuator cam 635. The sidewalls of the lateral trough preferably converge at an angle in the range of from about 160 degrees to about 176 degrees. The sidewalls of the longitudinal trough preferably converge at an angle in the range of from about 45 degrees to about 120 degrees.

Retractor

One of the features of the present invention is that cammming of the penetrator may include both engaging and disengaging of the opposed faces. Disengaging of the opposed faces may be provided by the retractor fork.

Figure 6:
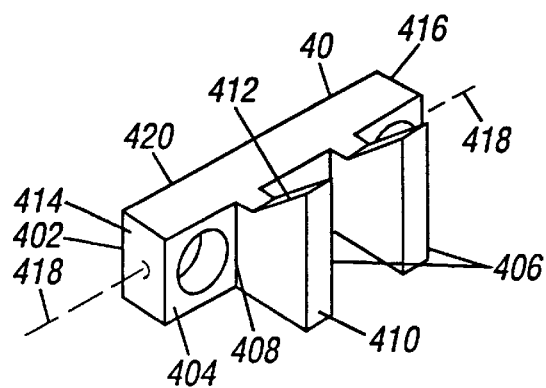
FIG. 6 is a perspective view of a retractor cam used in the present invention.

With reference to FIG. 6, the retractor cam 40 comprises a base plate 402 defining a first generally planar mounting face 404 and a pair of spaced apart parallel retractor arms 406 mounted to the first generally planar mounting face 404. The retractor arms 406 protrude generally normally from the first generally planar mounting face 404. Each retractor arm has an inner end 408 attached to the first generally planar mounting face 404 of the base plate 402 and an outer end 410. A side edge of each arm 406 forms a camming surface 412. The camming surfaces 412 of the pair of parallel retractor arms 406 lie in a single plane which forms an acute angle with the first generally planar mounting face 404 of the base plate 402.

In a preferred embodiment, the base plate 402 has a first end 414, a second end 416, and a longitudinal axis 418 extending between the first end and the second end. The base plate 402 is longitudinally elongated and has an opposed second generally planar mounting face 420 positioned generally parallel to the first generally planar mounting face (See also FIG. 13). The pair of parallel retractor arms 406 protrude from the first generally planar face 404 of the base plate in a direction generally normal to the longitudinal axis 418 of the base plate. Each of the pair of parallel retractor arms 406 is generally plate shaped and is positioned in a plane which is generally normal to the longitudinal axis 418 of the base plate. Each of the retractor arms has a first side edge and a second side edge with the second side edge forming the camming surface. The second side edge is positioned at an angle in the range of about 10 degrees to about 60 degrees with respect to the first generally planar mounting face 404. Each of the parallel retractor arms 406 tapers from the outer end 410 to the inner end 408. More preferably, the outer end 410 of each retractor arm 406 is generally planar and is positioned generally parallel to the first generally planar face 404 of the base plate. The outer end 410 meets the camming surface 412 at a point.

Detent

Figure 5:
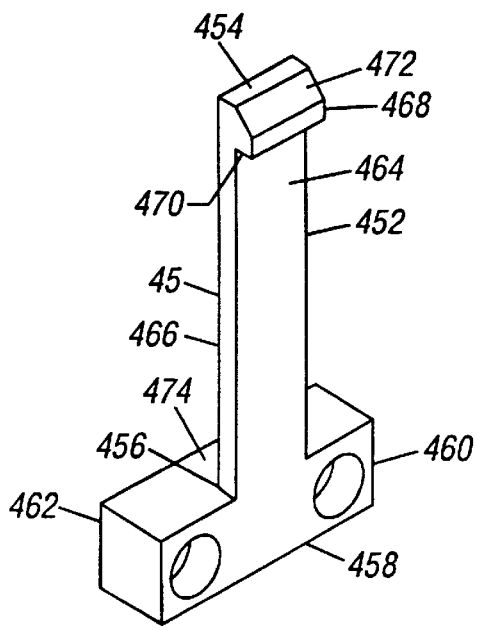
FIG. 5 is a perspective view of a pawl used in the subject invention.

With reference to FIG. 5, the pawl 45 is formed from a first elongated member 452 having a first end 454 and a second end 456 and a second elongated member 458 having a first end 460 and a second end 462. The second end 462 of the first elongated member 452 is attached to the second elongated member 458 so that the pawl 45 is generally T-shaped. The first elongated member 452 has a first generally planar face 464 and a second generally planar face 466 (see also FIG. 14) and a tooth element 468 protruding from the first generally planar face 464 at a position adjacent to the first end 454 of the first elongated member 452. The tooth element forms a tooth face 470 spaced apart from the first end 454 of the first elongated member 452. The tooth face 470 faces the second end 456 of the first elongated member. The tooth face 470 is preferably generally planar and forms an angle in the range of 80 degrees to 88 degrees with the first generally planar face 464 of the first elongated member 452. Preferably, the tooth element 468 further has a camming face 472 located adjacent to the first end 454 of the first elongated member 452. The camming face 472 is preferably generally planar and is positioned in a plane which is positioned at an angle in the range of from about 20 degrees to about 60 degrees with a plane containing the first face 464 of the first elongated member 452.

It is further preferred that the elongated member 452 has a first thickness and the second elongated member 458 has a second thickness which is greater than the first thickness. This relationship causes a step 474 to be formed where the second face 466 of the first elongated member 452 is attached to the second elongated member 458.

Alternate Detent

An alternate and presently preferred embodiment of the detent is described with reference to FIG. 20. A pawl 700 is formed from a first elongated member 702, a second elongated member 704 and a connecting member 706. The first elongated member 702 has a first end 708, a second end 710, and a longitudinal axis. The second elongated member 704 has a first end 712, a second end 714, and a longitudinal axis. The connecting member 706 connects the second end 710 of the first elongated member with the second end 714 of the second elongated member. The first elongated member is parallel to the second elongated member. Each of the first elongated member and the second elongated member has a tooth element 716, 718 protruding laterally from the elongated member at a position adjacent to the first end. Each of the tooth elements forms a tooth face 720, 722 spaced apart from the first end and facing the second end of their respective elongated member 702 and 704. Each tooth face forms an angle in the range of about 80 degrees about to 88 degrees with respect to the longitudinal axis of the elongated member.

Preferably, each tooth element 716, 718 further has a camming face 724, 726 located adjacent to the first end of the elongated member. The camming face is positioned in a plane which forms an angle in the range of from about 20 degrees to about 60 degrees with the longitudinal axis of the elongated member. The camming face 724 on the first elongated member 702 faces away from the second elongated member 704 and the camming face 726 on the second elongated member 704 faces away from the first elongated member 702. The tooth element 716 on the first elongated member 702 points away from the second elongated member 704 and the tooth element 718 on the second elongated member 704 points away from the first elongated member 702.

Preferably, the first elongated member and the second elongated member each has a first thickness as measured transverse to the longitudinal axis and the connecting member has a second thickness which is greater than the first thickness. A step 730 is formed where the first elongated member 702 and the second elongated member 704 connect to the connecting member 706.

Carrier Body

Figure 9:
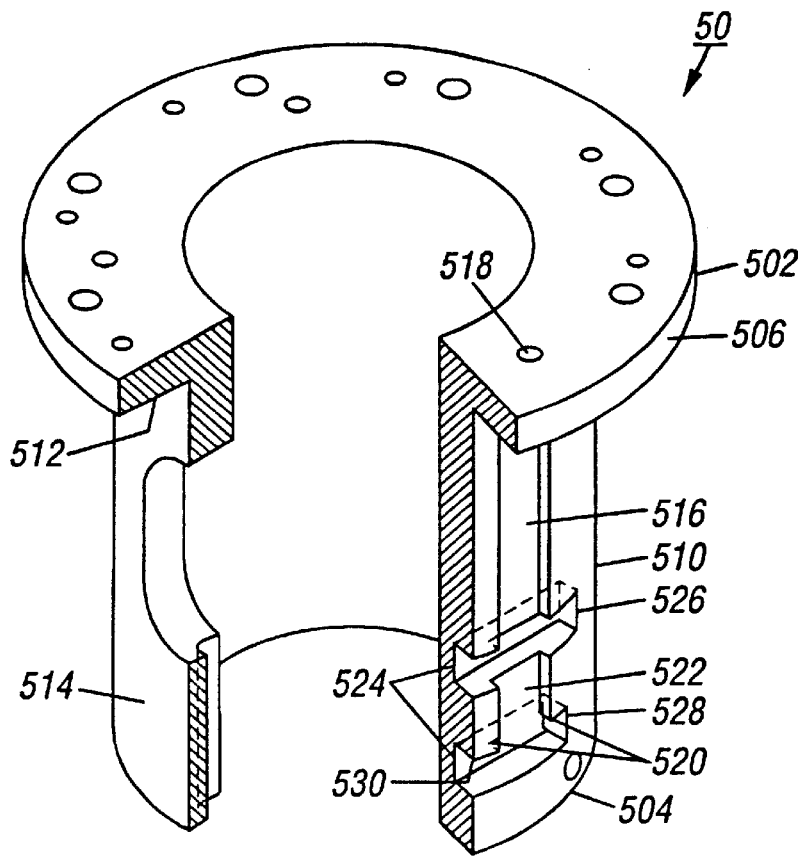
FIG. 9 is a perspective view, partially broken away, of the carrier body of the present invention.

With reference to FIG. 9, the carrier body 50 has a first end 502 and a second end 504. The carrier body 50 has a generally annular flange 506 positioned at the first end 504 and a generally tubular nose-piece 510 protruding from a face 512 of the generally annular flange 506. The nose-piece 510 has a generally cylindrical exterior surface 514. The exterior surface 514 defines a plurality of channels 516 extending generally longitudinally away from the generally annular flange 506. The flange preferably defines a borehole 518 in longitudinal alignment with each of the channels 516. Preferably, each of the channels 516 is defined by a pair of sidewall surfaces 520 and a bottom surface 522. Each borehole 518 which is in longitudinal alignment with its associated channel 516 is spaced apart from the bottom surface 522 of the channel 516. It is further preferred that the generally cylindrical exterior surface 514 further define a plurality of generally circumferential channels 524 extending generally circumferentially along the generally cylindrical exterior surface 514 of the nose piece 510 and crossing the generally longitudinally extending channels 516. Preferably, each of the generally longitudinally extending channels 516 is crossed by a first generally circumferentially extending channel 526 and a second generally circumferentially extending channel 528. The second generally circumferentially extending channel 528 crosses the generally longitudinally extending channel 516 at a second end 530 of each the generally longitudinally extending channels 516. It is further preferred that the circumferentially extending channels 524 do not extend completely around the tubular nose piece 510, so that each generally longitudinally extending channel 516 is crossed by a separate pair of a first generally circumferentially extending channel 526 and a second generally circumferentially extending channel 528.

OUTER COUPLING-SPOOL BODY

Certain embodiments of the invention require a means for defining a passage through the sidewall of the spool body and a means for defining an annular sealing surface on the inner sidewall of the spool body. Use of an outer coupling to define the radial flow passage and the seal surface is optional but preferred. It is also preferred to provide a protective diameter restriction in the spool above the connector (or to recess the seal surface from the inner surface of the spool) to prevent the seal surface on the connector from becoming damaged during operations. See FIG. 15 for shoulder 590 and recessing the outer coupling.

Figure 19:
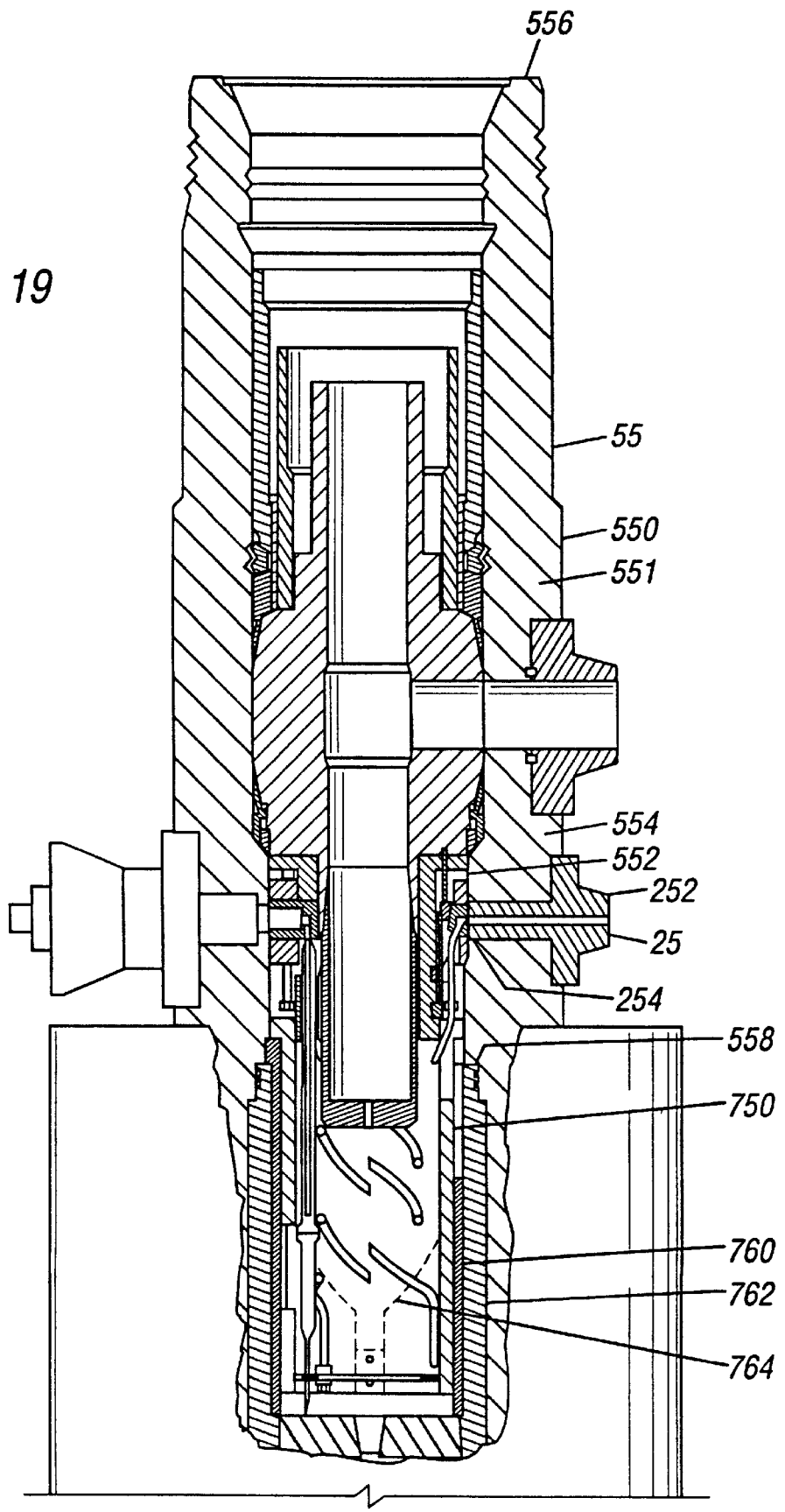
FIG. 19 is a vertical section through the assembly incorporating the present invention in a test stand.

With reference to FIG. 19, the spool body 55, sometimes called a tubing spool comprises tubular member 550 defined by a sidewall 551. The tubular member 550 has an inside surface 552, an outside surface 554, an upper end 556, and a lower end 558. The coupling element 25 extends generally radially through the sidewall of the spool body. The first end 252 of the coupling element is positioned adjacent to the outside surface 554 of the tubular member 550. The second end 254 of the coupling element is positioned adjacent to the inside surface 552 of the tubular member. Preferably, the second end is positioned no higher than the inside surface.

OUTER COUPLING-PENETRATOR

When the outer coupling is used to form a radial passage through the spool body and the seal surface on the inner sidewall, it is preferred that the outer coupling have a diameter greater than the diameter of the penetrator. This permits access to the penetrator for servicing, such as replacement of the seals.

The purpose of the penetrator/outer coupling connection is to establish a line connection to form a flow path for fluid or electrical current flow. The sealing surfaces of the connectors mate to isolate the flow path from the environment outside of the coupling connection.

Figure 13:
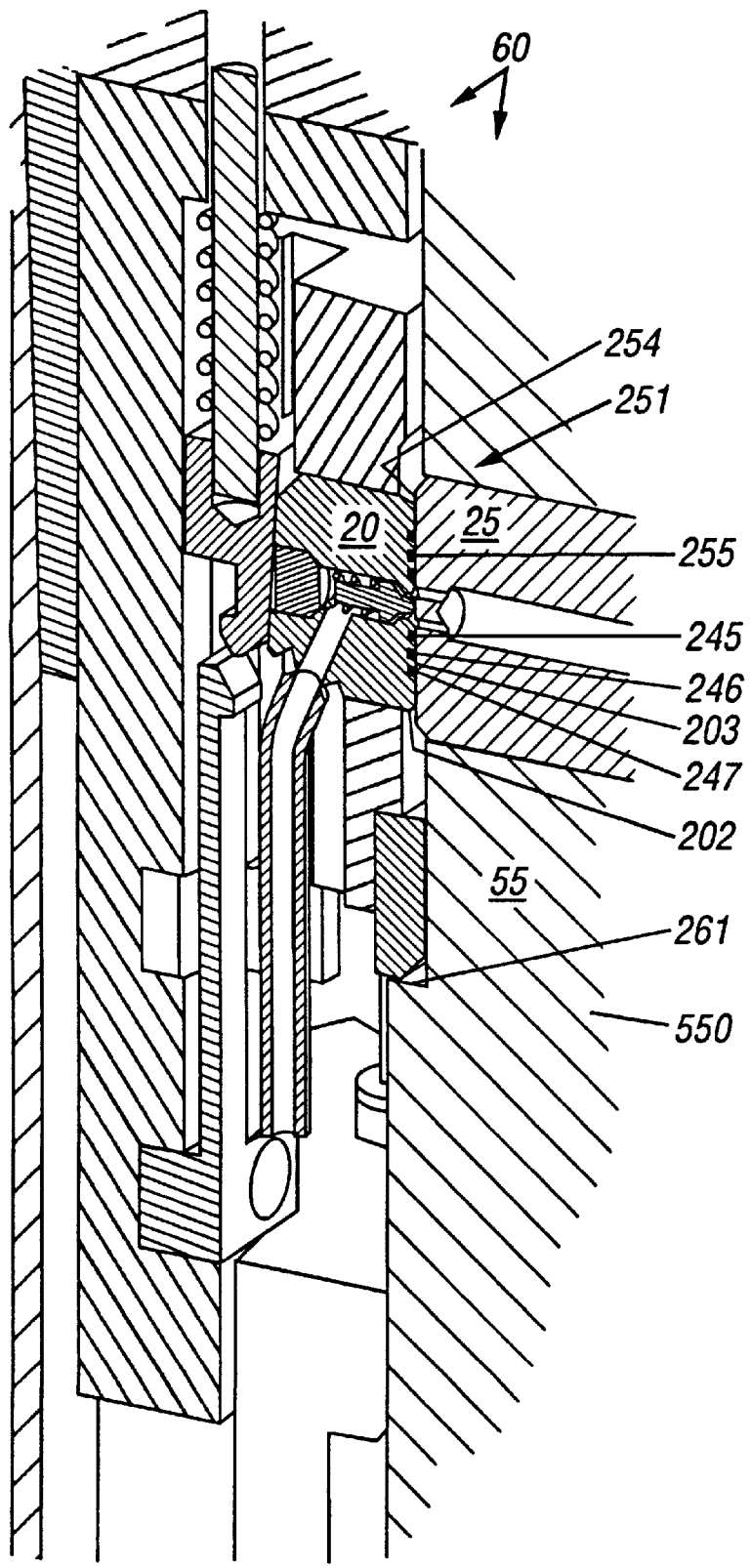
FIG. 13 is a section through the penetrator portion of the present invention, shown in a perspective orientation.

With reference to FIG. 13, the second end 202 of the first coupling element 20 defines sealing surface 203. The sealing surface 203 is preferably generally annular and flat. A means 251 for forming a seal surface on the inner sidewall of the spool body is provided by the second end 254 of the second coupling element 25. The second end 254 defines a sealing surface 255, which is preferably generally flat and annularly shaped and is positioned in contacting relationship with the sealing surface 203 of the first coupling element 20. A plurality of concentrically positioned seal elements 245, 246, 247 are positioned between the annularly shaped generally flat sealing surface 203 of the first coupling element 20 and the annularly shaped generally flat sealing surface 255 of the second coupling element 25. Preferably, the seal elements are positioned in the plurality of concentrically spaced grooves as previously described with reference to FIG. 2. A means 60 is associated with the first coupling element and the second coupling element for urging the first coupling element into sealing contact with the second coupling element. The means 60 can be comprised by the carrier ring 30, the sliding actuator cam 35, the pawl 45, the carrier body 50, and the spool body 55.

The first coupling element 20 is movable from a first position in which the sealing surface 203 is spaced apart from the sealing surface 255 to a second position in which the sealing surface 203 is sealingly engaged with the sealing surface 255.

OUTER COUPLING-POPPET VALVE

Figure 18:
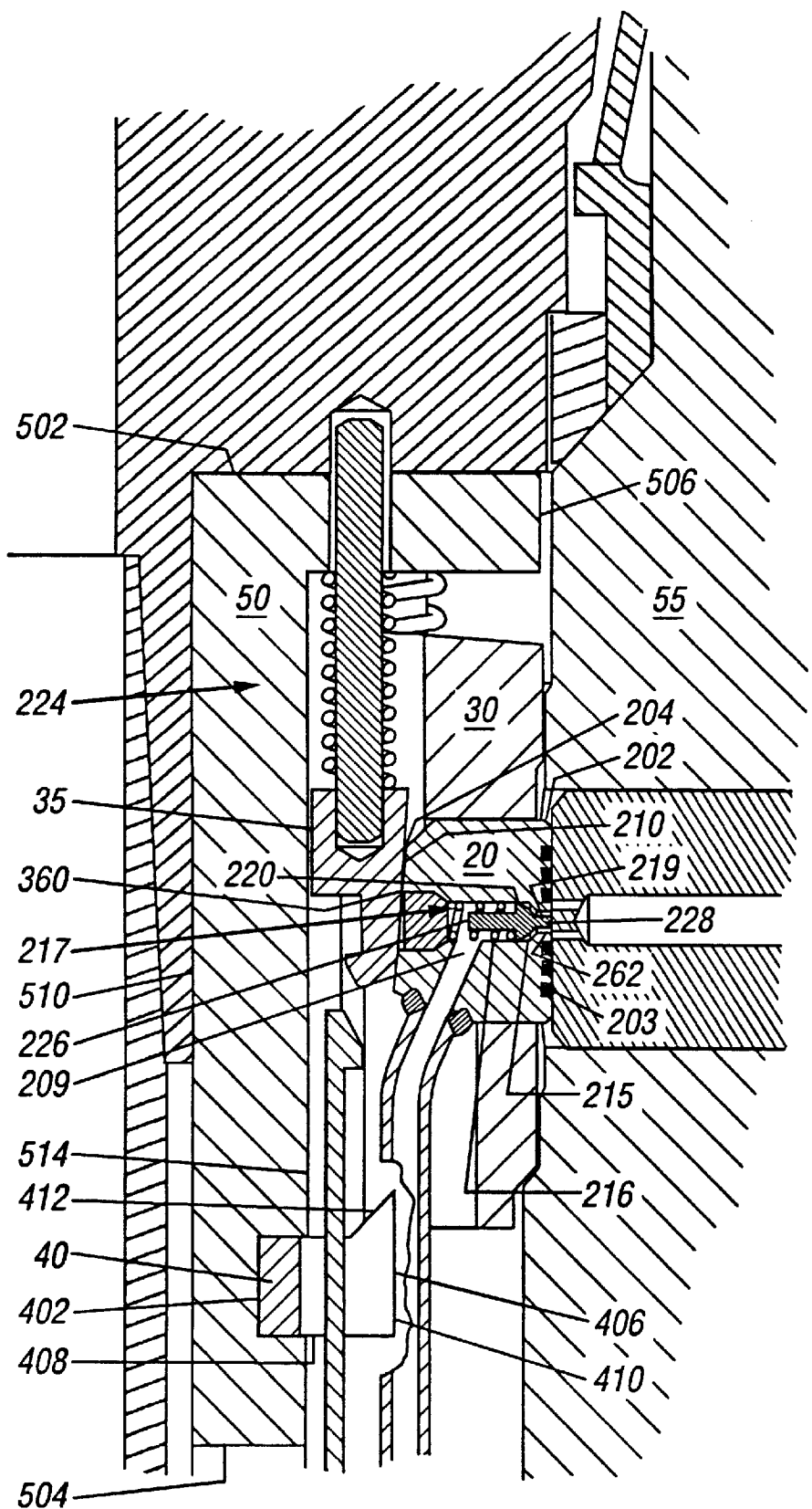

With reference to FIGS. 14 and 18, the first coupling element 20 has a first end 202 and a second end 204 and defines a passage 209 extending away from the second end. The first coupling element defines a valve seat 215 positioned in the passage 209 adjacent to the first end 202 and facing away from the first end 202.

The second coupling element 25 has a first end 252 and a second end 254. The passage 260 extends away from the second end 254. A land 262 for a valve body is located at the second end 254.

The valve element 216 is positioned in the passage 209 near the first end 202 of the first second coupling element 20. The valve element has a first end 226 and a second end 228 and a valve face 220 positioned between the first end and the second end which faces the second end 228 of the first coupling element 20. The second end 228 of the valve body 216 contacts the valve body land 262 on the second coupling element 25 to hold the valve face 220 off of the valve seat 215.

A means 217 is associated with the first coupling element 20 for biasing the valve body 216 toward the valve body land 262 and the first coupling element 20 away from the second coupling element 25. A coil spring positioned in the passage 209 forms a suitable means 217.

A means 225 is associated with the first coupling element 20 and the second coupling element 25 for urging the first coupling element 20 into contact with the second coupling element 25.

In the illustrated embodiment, the means 225 is formed by the carrier ring 30, the sliding actuator cam 35, the carrier body 50, and the spool body 55.

The poppet valve body is movable from a first position in which the valve face contacts the valve seat to a second position in which the valve face is spaced apart from the valve seat and the valve is in the open position. The valve body is carried by the penetrator and moves from the first position to the second position as the penetrator moves from the second position to the first position, due to the contact of the contact of the second end of the valve body with the valve body land.

PENETRATOR-CARRIER RING

When the penetrator is in the carrier ring, engaged against the outer coupling, and the wedge is fully engaged, slight vertical movement of the hanger body or carrier sleeve has no effect on the penetrator such as unlock on sealing.

Figure 12:
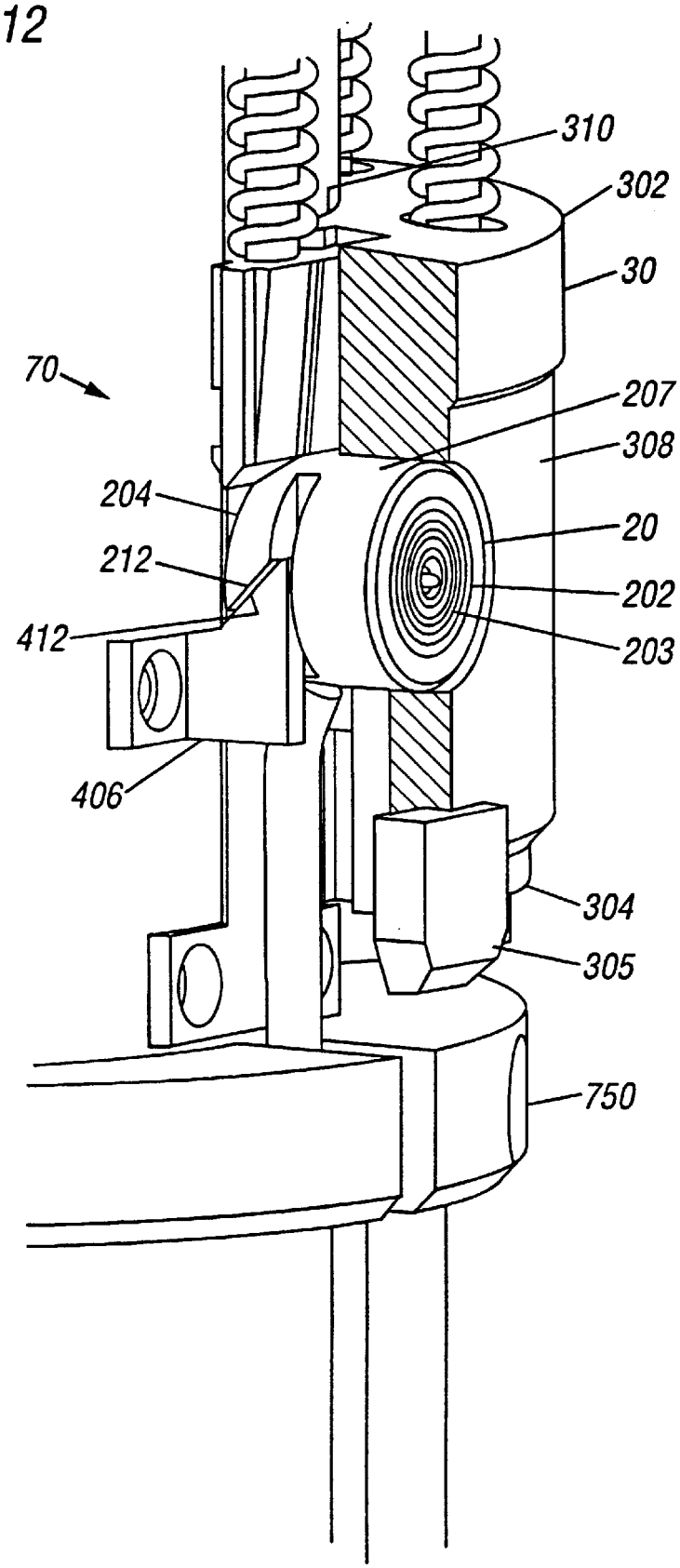
FIG. 12 is a detailed perspective view of a penetrator of the present invention, part of the carrier ring being broken away.

With reference to FIG. 12, the carrier ring 30 has a first end 302, a second end 304, and a longitudinal axis. A generally cylindrical outer surface 308 is positioned about the longitudinal axis. A generally cylindrical inner surface 310 is positioned concentrically with the outer surface 308. The carrier ring 30 defines a plurality of generally radial boreholes 312 extending from the outer surface 308 to the inner surface 310. A plurality of coupling elements 20 are slidably positioned in the boreholes 312, one coupling element per borehole. Each coupling element 20 has a first end 202, a second end 204, an outer side surface 207, and a longitudinal axis extending between the first end and the second end. The first end 202 forms a sealing surface 203 which is positioned adjacent to the generally cylindrical outer surface 308 of the carrier ring. The sealing surface extends generally normally to the longitudinal axis of the coupling element 20.

Figure 15:
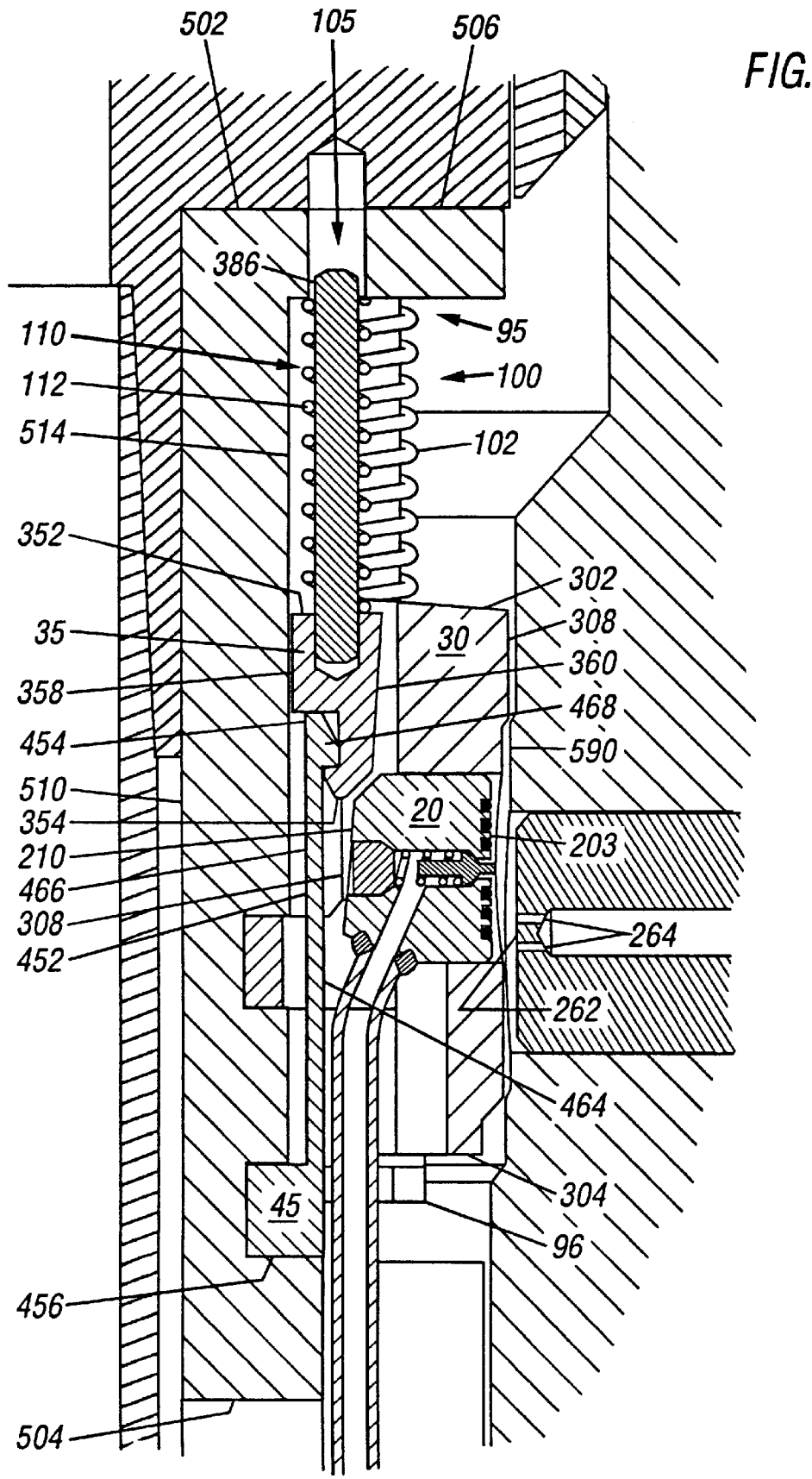
FIGS. 15 to 18 are vertical sections through a penetrator of the present invention showing sequential steps in the lowering and wedging actions.

The penetrators are carried by the carrier ring. The penetrators are radially movable with respect to the carrier ring from a first position as shown in FIG. 15 in which the sealing surface 203 slightly recessed radially inwardly from the outer surface 308 of the carrier ring 30 to a second position as shown in FIG. 18 in which the sealing surface 203 protrudes radially outwardly from the outer surface 308 of the carrier ring 30. The movement is due to the action of the wedge 35.

PENETRATOR-WEDGE

The wedge could act other than on the radial inward end of the penetrator. For example, the penetrator could include an o/d flange, interacting with a wedge "horseshoe" engaged over the penetrator body, in a manner similar to the illustrated retractor. The wedge could also be actuated in other ways. It could be actuated by weight set camming motion (wedge/carrier ring lands in spool, penetrators are driven over it), or by a separate actuator ring driven by the tubing hanger installation tool, or by integral hydraulic pistons.

It is important that the penetrator be seated squarely on the face of the outer coupling element in the spool. Misalignment of the penetrator in the carrier ring's radial port may interfere with this. Eccentricity of the carrier ring to the hanger and spool may also interfere with this.

Misalignment in the horizontal plane can be "righted" by providing the interface between the wedge and penetrator as a line of contact instead of a plane (the camming surface on the wedge may be milled to a very narrow vertical band; this contact at the center of the planar back face of the (penetrator as illustrated).

Looking at loads on the penetrator in the horizontal plane, this provides a single, central actuating load on the penetrator. It allows for an eccentric reaction where the penetrator contacts the spool seal surface. A moment results from the offset of these forces, acting to turn the penetrator to a right orientation in the horizontal plane.

Figure 17:
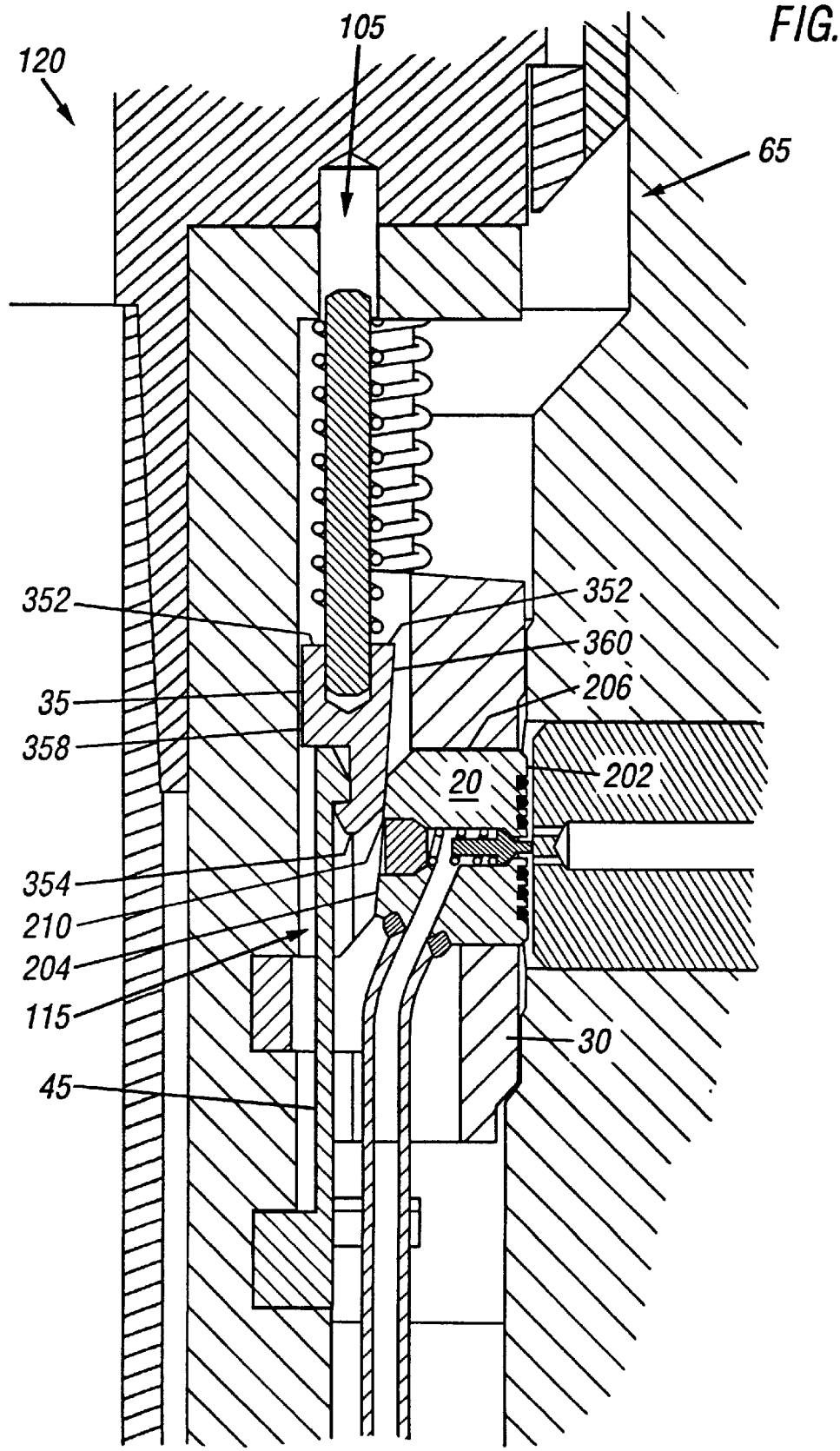

With reference to FIG. 17, the coupling element 20 has an outer surface 206, a first end 202, a second end 204, and a longitudinal axis extending between the first end and the second end. A portion of the outer surface 206 of the coupling element defines a cam follower surface 210 forming an angle in the range of about 80 degrees to about 88 degrees with respect to the longitudinal axis of the coupling element 20. The sliding actuator cam 35 has a first end 352, a second end 354, and a longitudinal axis extending between the first end and the second end. The sliding actuator cam has a generally planar cam surface 360 lying in a plane which extends at an angle in the range of about 2 degrees to about 10 degrees with respect to the longitudinal axis of the actuator cam. The cam surface 360 of the actuator cam 35 is positioned parallel to the camming surface 210 of the coupling element 20. Preferably, the cam surface 360 is formed by a rib 366. The longitudinal axis of the coupling element 20 is positioned at a right angle with respect to the longitudinal axis of the actuator cam 35. A means 65 is provided for moving the actuator cam along its longitudinal axis to urge the cam surface 360 of the sliding actuator cam 35 against the camming surface 210 of the coupling element 20 and cause the coupling element 20 to move along its longitudinal axis. In the illustrated embodiment, the means 65 comprises the carrier ring 30, the pawl 45, the carrier body 50, and the spool body 55.

Preferably, the coupling element moves away from the longitudinal axis of the sliding actuator cam.

The wedge 35 is movable along its longitudinal axis from a first position as shown in FIG. 15 in which the cam surface 360 of the wedge is spaced apart from the camming surface 210 of the coupling element 20 to a second position as shown in FIG. 18 in which the cam surface 360 of the wedge 35 is in contact with the camming surface 210 of the coupling element 20. As the wedge moves from the first position to the second position, the coupling element is moved from its first position to its second position. As the coupling element is moved, the cam surface moves along the camming surface to wedge the coupling element radially outwardly to make the seal.

PENETRATOR-RETRACTOR

With reference to FIG. 12, the coupling element 20 has an exterior surface 207, a first end 202, a second end 204, and a longitudinal axis extending between the first end and the second end. The exterior surface 207 of the coupling element 20 defines at least one cam follower surface 212. Each of said at least one cam follower surfaces 212 forms an angle in the range of about 10 degrees to about 60 degrees with respect to the longitudinal axis of the coupling element 20. At least one retractor arm 406 has a side edge forming a camming surface 412 positioned parallel to the at least one camming surface 212 of the coupling element 20. A means 70 is provided for moving the at least one retractor arm 406 at a right angle with respect to the longitudinal axis of the coupling element 20 to urge the cam surface 412 of the at least one retractor arm 406 against the at least one camming surface 212 of the coupling element 20 and cause the coupling element to move in a direction along its longitudinal axis. In the illustrated embodiment, the means 70 comprises the carrier ring 30 and the carrier body 50.

The retractor arm is movable with respect to the penetrator from a first position as shown in FIG. 12 in which the cam surface 412 of the retractor arm contacts the camming surface 212 of the penetrator and locates the penetrator in the first position to a second position as shown in FIG. 18 in which the cam surface 412 of the retractor arm is spaced apart from the camming surface of the penetrator and the penetrator is in the second position. The movement of the retractor arm is generally at a right angle with respect to the movement of the penetrator.

PENETRATOR-POPPET VALVE

The spring loaded check valve in the penetrator is customary but, strictly, optional. Its presence allows pressure to be "locked" in the line to hold downhole valves open as tubing is being run. In addition, pressure thus locked in the line will vent as the valve is stabbed open. This will serve to clean the seal face as it is engaged. Notice finally that it incidentally assists the retraction of the penetrator body into the carrier ring.

With reference to FIG. 18, the coupling element 20 has a first end 202, a second end 204, and a longitudinal axis extending between the first end and the second end. The coupling element 20 defines a passage 209 having a first diameter extending from the first end 202 along the longitudinal axis. The coupling element 20 has a valve seat 215 facing the second end 204 positioned in the passage 209 adjacent to the first end 202. A valve element 216 is positioned in the passage 209 adjacent to the first end 202. The valve element 216 has a valve face 220 positioned to sealingly contact the valve seat 215 and a nipple 219 having a second diameter which is smaller than the first diameter extending past the valve face 220 to protrude from the first end 202 of the coupling element 20 when the valve face 220 is positioned against the valve seat 215. A means 217 is associated with the valve element 216 and the coupling element 20 for biasing the valve face 220 toward the valve seat 215. In the illustrated embodiment, the means 217 is formed by a coil spring.

As previously discussed, the valve element is movable from a first position in which the valve face contacts the valve seat to a second position in which the valve element is spaced apart from the valve seat.

CARRIER RING-SPOOL BODY

If radial preloads on the penetrators are asymmetrical to the well axis, a net side load on the carrier ring will result. This must be accommodated in some way, so that the carrier ring is not pushed off center. One technique is to provide a tight fit between the carrier ring and the spool, or alternatively, adequate clearances between ring, hanger and spool.

Use of cylindrical penetrators, as shown, offers some manufacturing benefits, but is not ideal in theory. The design demands alignment of the penetrator to the seal face on the outer coupling element. Vertical alignment is assured by close dimensional tolerance in the relationship of the stop shoulder and the penetrator. Lateral alignment is more of a problem, depending on rotational orientation of the ring and spool, along with the magnitude of the interface diameter.

As a consequence, as previously noted, the ideal cross-section for the penetrator is rectangular. This would allow a tight vertical fit to the carrier ring (top\bottom). At the same time it would allow a loose(r) lateral fit (side/side). The cylindrical penetrator provides an equal fit all around, but is easier to manufacture.

With reference to FIG. 14, the spool body 55 is formed from a tubular member 550 defined by a sidewall 551 having a generally cylindrical inner surface 552 and an outer surface 554 which is generally concentric with the generally cylindrical inner surface 552. (See FIG. 19). The tubular member 550 has a longitudinal axis. There is provided a means 75 for defining a flow passage through the sidewall 551 of the tubular member 550. The carrier ring 30 is defined by a sidewall 301 having a generally cylindrical inner surface 310 and a generally cylindrical outer surface 308. (See FIG. 16). The carrier ring 30 has a longitudinal axis and is positioned coaxially inside the tubular member 551 with the generally cylindrical outer surface 308 of the ring 30 being positioned closely adjacent to the generally cylindrical inner surface 552 of the tubular member 55. A means 80 forms a flow passage through the sidewall 301 of the ring 30. A means 85 is associated with the tubular member 550 and the carrier ring 30 for aligning the means 80 for defining the flow passage through the sidewall of the carrier ring 30 with the means 75 for defining the flow passage through the sidewall of the tubular member 550. In a preferred embodiment, the means 75 is formed by the coupling element 25. The means 80 is formed by the coupling element 20. The means 85 is formed by key 305 attached to the outer surface of the carrier ring 30 adjacent the lower end thereof (see FIG. 12), which is received by a keyway 561 (see FIG. 13) in the tubular member 550.

A step in the diameter at the interface between the cylinder bodies, adjacent to the penetrator interface, can serve to help protect the fixed contact face from damage due to the passage of other elements through the cylinder (such as tubing through the tubing spool).

Figure 11:
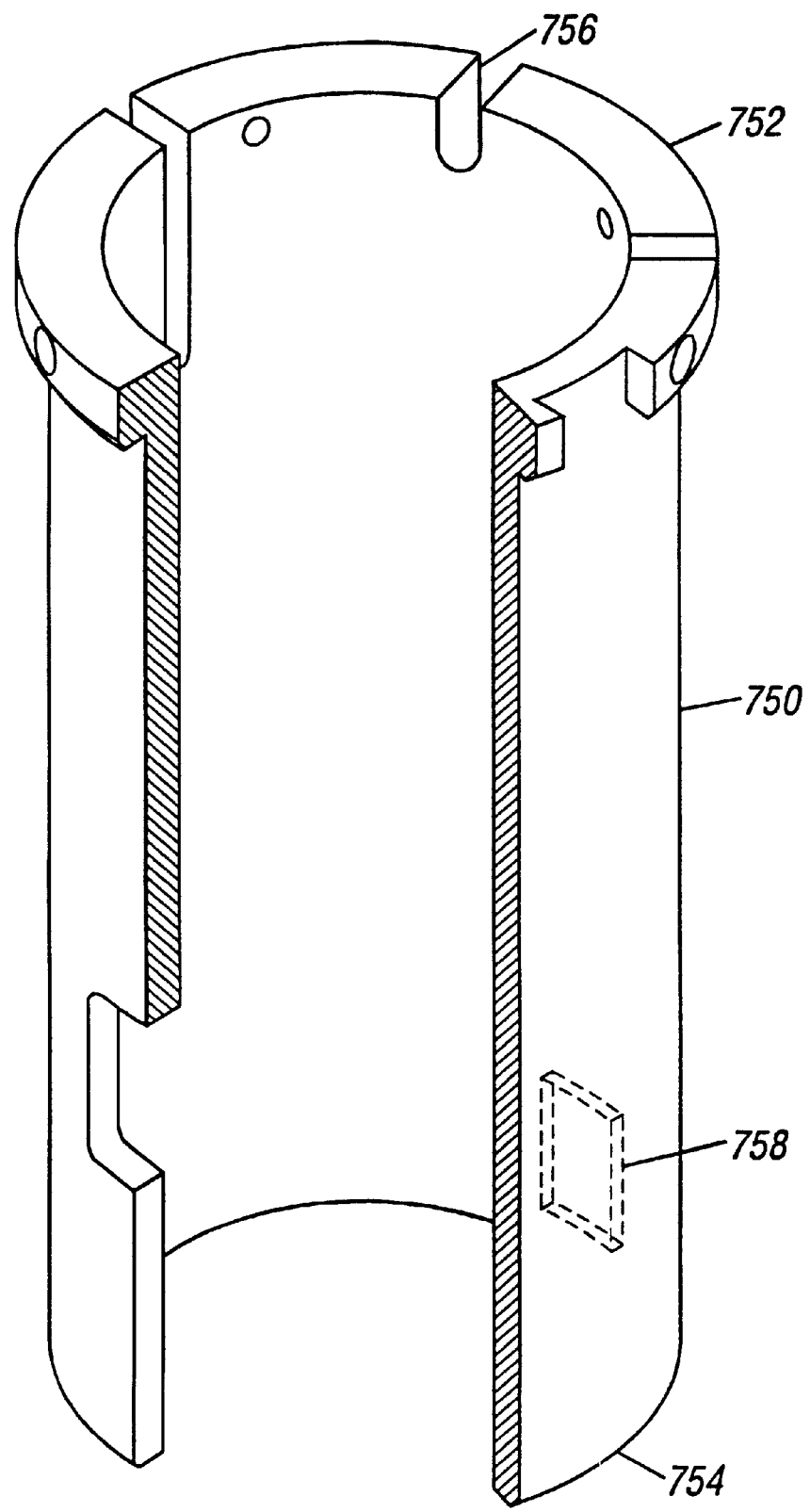
FIG. 11 is a perspective view, partially broken away, of the orientation sleeve used with the present invention.

Rotational alignment of the carrier ring 30 to the spool body is provided as follows. An orientation sleeve 750 (see FIG. 1) is attached to the lower end 504 of the carrier body 50 by radial bolts, not shown. The orientation sleeve 750 has an upper end 752 which is attached to the carrier body and a lower end 754. (See FIG. 11) Slots 756 are provided at the upper end to permit passage of tubing leading from the penetrators. A key 758 is attached to an outer generally cylindrical surface of the orientation sleeve adjacent to the lower end 754. A helix sleeve 760 is attached to the inside surface of well tubing 762. The upper end of the helix sleeve is formed into a tapering slot 764. The lower end of the tapering slot 764 is sized to closely receive the key 758. As the orientation sleeve 750 is lowered into the helix sleeve 764, the carrier ring 30 is rotated into alignment with the spool body sufficient to permit key 305 attached to the outer surface of the carrier ring 30 to be received by keyway 561 (see FIG. 13) in the tubular member 550 as the carrier ring bottoms against its stop.

CARRIER RING-WEDGE

Figure 16:
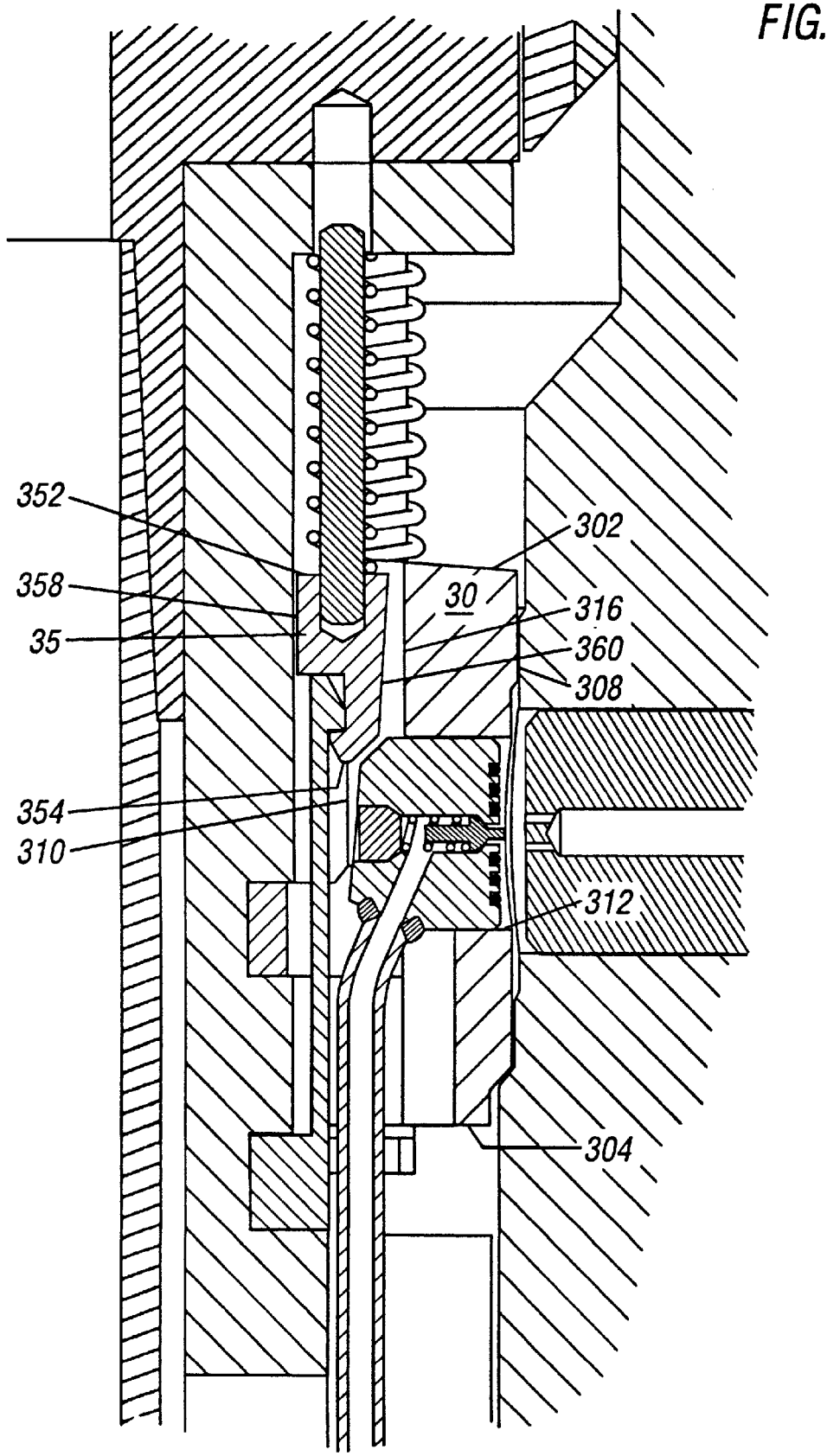

With reference to FIG. 16, the carrier ring 30 has a first end 302, a second end 304, a longitudinal axis, a generally cylindrical outer surface 308 positioned about the longitudinal axis, and a generally cylindrical inner surface 310 positioned concentrically with the outer surface. The carrier ring 30 defines at least one generally radially extending borehole leading from the outer surface 308 to the inner surface 310 and a generally longitudinally extending slot 316 along the generally cylindrical inner surface 310 from the first end to the second end connecting with the borehole 312. The sliding actuator cam 35 has a first end 352, a second end 354, a longitudinal axis extending between the first end and the second end. The sliding actuator cam has a first side surface 358 positioned generally parallel to the longitudinal axis, and a generally planar cam surface 360 on an opposite side of the cam 35 from the first side surface.

The cam surface 360 extends at an angle in the range of about 2 degrees to about 10 degrees with respect to the longitudinal axis. The sliding actuator cam 35 is slidably received in the slot 316 of the carrier ring 30 for longitudinal movement. The first side surface 358 faces the longitudinal axis of the carrier ring 30. A means 90 is associated with the carrier ring 30 and the sliding actuator cam 35 for limiting radial movement of the actuator cam 35 in the radial direction with respect to the longitudinal axis of the carrier ring 30. In a preferred embodiment, the means 90 comprises ribs 368, 370 (see FIG. 7) which are received by grooves 323 (See FIG. 10).

The cam 35 is movable from a first position as shown in FIG. 15 to a second position as shown in FIG. 18 with respect to the carrier ring 30.

CARRIER RING-CARRIER BODY

If radial preloads on the penetrators are asymmetrical to the well axis, a net side load on the carrier ring will result. This must be accommodated in some way, so that the hanger is not pushed off center. One technique is to provide adequate radial clearances between ring, hanger and spool.

With reference to FIG. 15, the carrier body 50 has a first end 502, a second end 504, and a longitudinal axis extending between the first end and the second end. The carrier body 50 is generally tubular and has a generally annular flange 506 positioned at the first end 502 and a generally tubular nose-piece 510 protruding from a face of the flange 506. The nose-piece 510 has a generally cylindrical exterior surface 514. The carrier ring 30 has a first end 302, a second end 304, and longitudinal axis. A generally cylindrical outer surface 308 is positioned about the longitudinal axis and a generally cylindrical inner surface 310 is positioned concentrically with the outer surface 308. The carrier ring 30 is coaxially positioned with respect to the tubular carrier body 50 with the generally cylindrical inner surface 310 of the carrier ring 30 being positioned closely adjacent to the generally cylindrical outer surface 514 of the tubular nose piece 510.

Spring bias can be provided between the inner cylinder and the carrier ring to assure proper sequence of withdrawal or retraction of the penetrator. A secondary detent can also be used to hold down the carrier ring if the retraction forces are greater than the spring forces.

A mounting means 95 is associated with the carrier ring 30 and the flange 506 for slidably mounting the carrier ring 30 to the tubular carrier body 50 in a fixed rotational orientation for movement from a first position as shown in FIG. 15 to a second position, closer to the flange, as shown in FIG. 18. A biasing means 100 is associated with the mounting means 95 for biasing the carrier ring 30 away from the flange 506, toward the first position. As the carrier ring moves from the first position to the second position, the wedge moves from the first position, which is spaced apart from the penetrator, to the second position, in which it is in wedging relationship with the penetrator. In a preferred embodiment, the means 95 is formed by bolts 96 to which the carrier ring 30 is slidably mounted and which are threadably secured in the flange 506. The biasing means 100 comprises coil springs 102 surrounding the shafts of bolts 96 and positioned between the flange 506 and the carrier ring 30 to urge the carrier ring away from the flange 506. (See also FIG. 1).

WEDGE-CARRIER BODY

With reference to FIG. 15, the carrier body 50 has a first end 502, a second end 504, and a longitudinal axis extending between the first end and the second end. The carrier body 50 is generally tubular and has a generally annular flange 506 positioned at the first end 502 and a generally tubular nose-piece 510 protruding from a face of the flange 506. The nose-piece 510 has a generally cylindrical exterior surface 514. The sliding actuator cam 35 has a first end 352, a second end 354, and a longitudinal axis extending between the first end and the second end. The actuator cam 35 has a first side surface 358 positioned generally parallel to the longitudinal axis, and a generally planar cam surface 360 on an opposite side of the sliding actuator cam 35 from the first side surface 358. The cam surface 360 extends at an angle in the range of about 2 degrees to about 10 degrees with respect to the longitudinal axis. The sliding actuator cam 35 is positioned with respect to the tubular carrier body 50 so that the longitudinal axis of the sliding actuator cam 35 is positioned parallel to the longitudinal axis of the tubular carrier body. The first side surface 358 of the sliding actuator cam 35 faces the generally cylindrical exterior surface 514 of the generally tubular nose piece 510 and the sliding actuator cam 35 tapers away from the generally annular flange 506.

Spring bias can be provided on the locking wedge to assure it stays locked in the case of vibration, or a lower than expected friction factor.

A mounting means 105 is associated with the sliding actuator cam 35 and the flange 506 for slidably mounting the sliding actuator cam 35 to the tubular carrier body 50 in a fixed rotational orientation. A biasing means 110 is associated with the mounting means 105 for biasing the sliding actuator cam 35 away from the flange 506.

In a preferred embodiment, the means 105 is formed by shafts 386 which are slidably received by the flange 506 and fixedly mounted to the first end 352 of the sliding actuator cam 35. The biasing means 110 comprises coil springs 112 surrounding the shafts 386 and positioned between the flange 506 and the actuator cam 35 to urge the actuator cam 35 away from the flange 506. (See also FIG. 1).

As the carrier body is lowered, the wedge contacts the penetrator and moves it toward the first position. When the penetrator seats in the first position, the carrier body is not yet bottomed against its stop and continues moving with respect to the wedge. The shafts 386 are slidably received and taken up in the boreholes 518 in the flange 506 until the carrier body bottoms against its stop.

WEDGE-DETENT

With reference to FIG. 17, the sliding actuator cam 35 has a first end 352, a second end 354, and a longitudinal axis extending between the first end and the second end. The actuator cam 35 has a first side surface 358 and a generally planar cam surface 360. The cam surface 360 extends at an angle in the range of about 2 degrees to about 10 degrees with respect to the longitudinal axis. A detent means 115 is associated with the first side surface 358 of the sliding actuator cam 35 for limiting relative movement between the sliding actuator cam 35 and the detent means 115 along the longitudinal axis of the sliding actuator cam 35 when the detent means is engaged with the sliding actuator cam 35. A mounting means 120 is associated with the detent means 115 and the sliding actuator cam 35 for movably mounting the detent means 115 with respect to the sliding actuator cam 35 when the detent means is disengaged from the sliding actuator cam 35. In one embodiment of the invention, the detent means comprises the pawl 45. In a preferred embodiment of the invention, the mounting means comprises the carrier body 50 and the mounting means 105.

Figure 22:
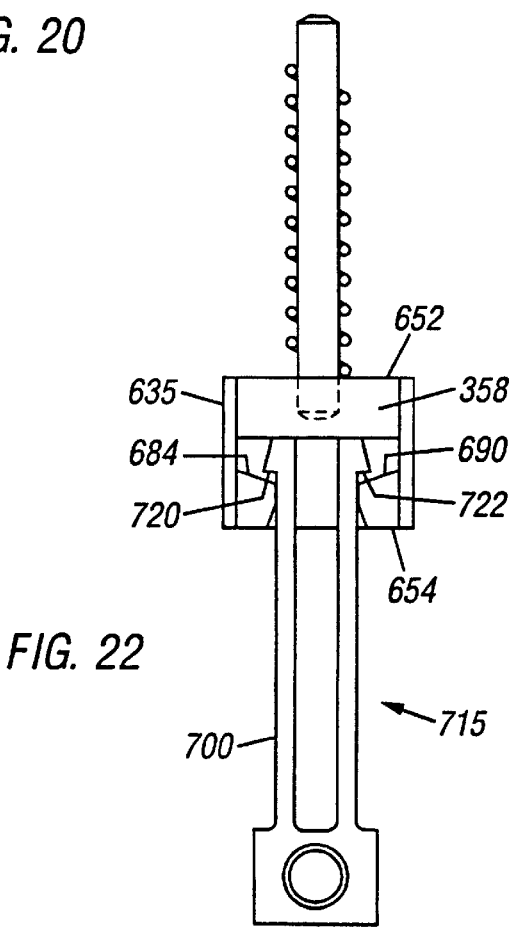
FIG. 22 is a reverse plan view of the elements shown in FIG. 20 is assembled form.
Figure 23:
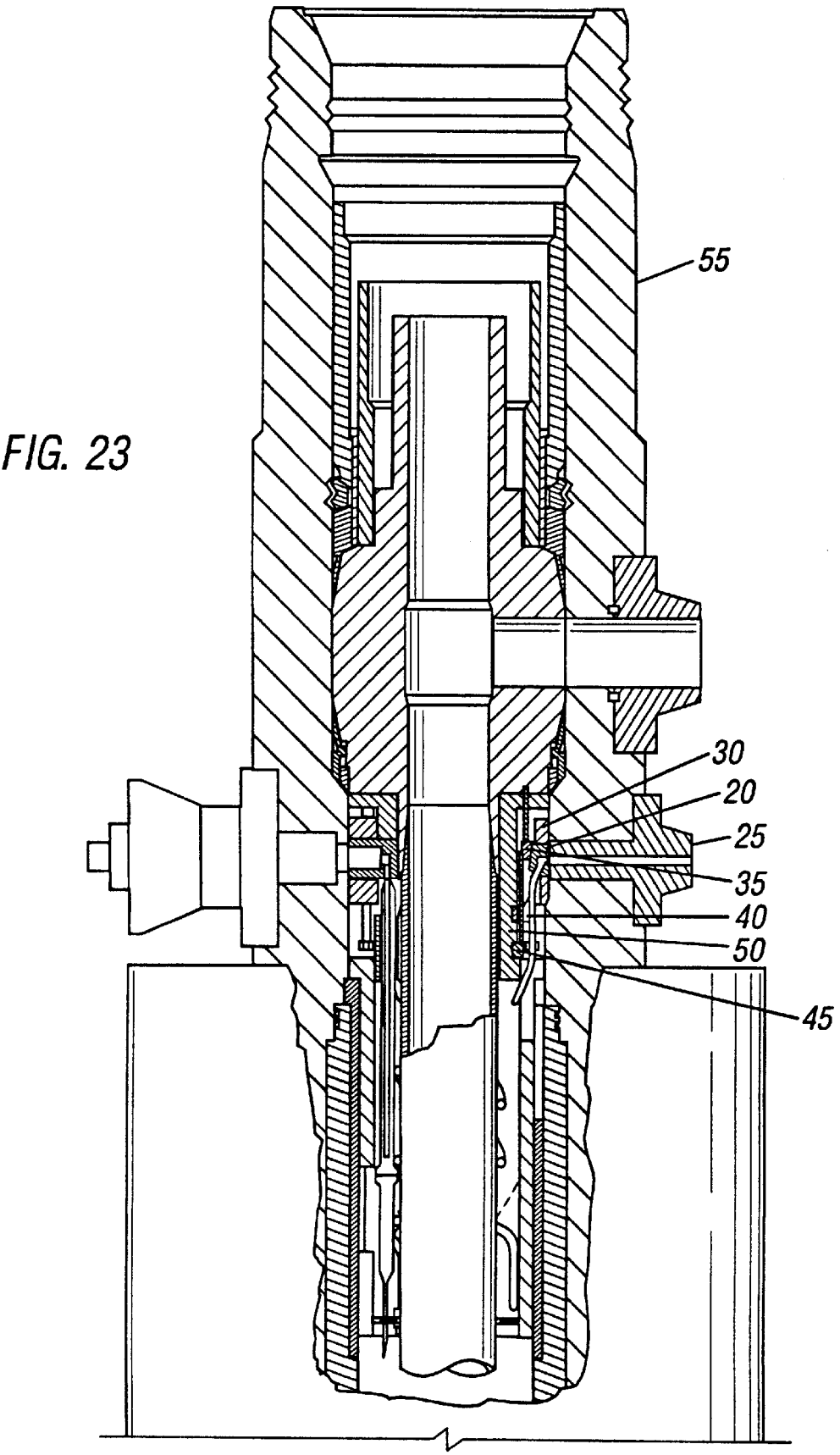
FIG. 23 is a vertical section through the assembly incorporating the present invention in a well.

In another and preferred embodiment of the invention, and with reference to FIG. 22, the sliding actuator cam 635 has a first end 652, a second end 654, and a longitudinal axis extending between the first end and the second end. The actuator cam 635 has a first side surface 658 and a generally planar cam surface 660. (See FIG. 20). The cam surface 660 extends at an angle in the range of about 2 degrees to about 10 degrees with respect to the longitudinal axis. A detent means 715 is associated with the first side surface 658 of the sliding actuator cam 635 for limiting relative movement between the sliding actuator cam 635 and the detent means 715 along the longitudinal axis of the sliding actuator cam 635 when the detent means is engaged with the sliding actuator cam 635. A mounting means, not shown in FIG. 22 but which can be the same as the mounting means 120, is associated with the detent means 715 and the sliding actuator cam 35 for movably mounting the detent means 715 with respect to the sliding actuator cam 635 when the detent means is disengaged from the sliding actuator cam 635. In one embodiment of the invention, the detent means comprises the pawl 700. In a preferred embodiment of the invention, the mounting means comprises the carrier body 50 and the mounting means 105.

As the carrier body is lowered, the wedge contacts the penetrator and moves it toward the first position. When the penetrator seats in the first position, the carrier body is not yet bottomed against its stop and continues moving with respect to the wedge. This causes the detent to release and continue travel with the carrier body until the carrier body seats against its stop. When the carrier body is raised, the detent reengages the wedge. The detent moves from a first position, a shown in FIG. 15, which is in engagement with wedge, to a second position, as shown in FIG. 18, which is spaced apart from the wedge. When the pawl 45 is used as the detent, the surface 470 contacts the surface 374 when the pawl is in the first position. When the pawl 700 is used as the detent, the surfaces 720 and 722 contact the surfaces 684 and 690 when the pawl is in the first position. See FIG. 22.

CARRIER BODY-DETENT

With reference to FIG. 15, the carrier body 50 has a first end 502, a second end 504, and a longitudinal axis extending between the first end and the second end. The carrier body 50 is generally tubular and has a generally annular flange 506 positioned at the first end 502 and a generally tubular nose-piece 510 protruding from a face of the flange 506. The nose-piece 510 has a generally cylindrical exterior surface 514. The pawl 45 is mounted to the tubular carrier body 50. The pawl 45 is formed from an elongated member 452 having a first end 454 which is spaced apart from the tubular carrier body and a second end 456 which is fixedly attached to the tubular carrier body 50. The elongated member 452 extends generally longitudinally along the generally cylindrical exterior surface 514 of the nose piece 510 and has a first generally planar face 464 with a tooth element 468 protruding from the first generally planar face 464 at a position adjacent to the first end 454 of the elongated member 452. The elongated member 452 has second generally planar face 466 which faces the generally cylindrical exterior surface 514 of the tubular carrier body 50. The detent 700 can be mounted to the carrier body 50 in the same manner as the pawl 45. Preferably, when the detent 45 is employed, the second elongated member 458 is received by the channel 528 in the carrier body. When the detent 700 is employed, the connecting member 706 is received by the channel 528 in the carrier body. In both cases, the pawl arms are positioned in a channel 516 in the carrier body to minimize required radial clearance between the carrier ring and the carrier body.

CARRIER BODY-RETRACTOR

With reference to FIG. 18, the carrier body 50 has a first end 502, a second end 504, and a longitudinal axis extending between the first end and the second end. The carrier body 50 is generally tubular and has a generally annular flange 506 positioned at the first end 502 and a generally tubular nose-piece 510 protruding from a face of the flange 506. The nose-piece 510 has a generally cylindrical exterior surface 514. The retractor cam 40 comprises a base plate 402 and at least one retractor arm 406 mounted to the base plate. The base plate 402 is mounted to the generally cylindrical exterior surface 514 of the tubular carrier body 50 and the at least one retractor arm 406 protrudes from the base plate 402. Preferably, a pair of retractor arms 406 are mounted to the base plate. The pair of retractor arms are equidistant from the flange 506. Each retractor arm has an inner end 408 attached to the base plate 402 and an outer end 410. A side edge of each arm forms a camming surface 412 which faces generally longitudinally along the tubular carrier body 50. Each of the pair of parallel retractor arms 406 tapers from the outer end 410 to the inner end 408 so that the camming surfaces 412 one in a plane which forms an angle in the range of about 20 degrees to about 60 degrees with respect to the longitudinal axis of the tubular carrier body 50.

Preferably, the base plate 404 of the retractor 40 is mounted in the channel 526 of the carrier body. The channel 526 is positioned between the channel 528 and the flange 506 of the carrier body.

COMBINATION

A tubular member 550 preferably in the form of a spool body 55 has a generally cylindrical inside surface 552 and an outside surface 554 and a longitudinal axis. The carrier ring 30 has a generally cylindrical inside surface 308 and a generally cylindrical outside surface 310 and a longitudinal axis. The carrier ring 30 is positioned coaxially in the tubular member 550 with the outside surface of the carrier ring positioned adjacent to the inside surface of the tubular member 550. The coupling element 20 is carried by the carrier ring 30. The coupling element 20 has a longitudinal axis which is generally radially positioned with respect to the longitudinal axis of the carrier ring 30. The coupling element has an inner end and an outer end, the outer end having a sealing face. A means 251 defines a sealing face on the inside surface of the tubular member 550. The sealing face of the first coupling element sealing engages the sealing face defined by the means on the inside surface of the tubular member 550. A means 120 is provided for urging the sealing face of the coupling element and the sealing face defined by the means on the tubular member 550 together responsive to relative longitudinal movement between the means for urging and the tubular member 550.

In a preferred embodiment, the means 120 comprises the carrier body 50, the sliding actuator cam 635 and the pawl 700. The means 251 comprises the coupling element 25.

MODULAR UNIT

One of the features of the present invention is that penetrator movement is cammed by the relative movement between two cylinders. If the movable penetrator is on the inner cylinder, it can be constructed as part of a free standing modular assembly. This would allow attachment to a wide variety of tubing hanger designs.

The whole arrangement can be beneficially arranged so that the larger part of the vertical extent of the system hangs down into the well, rather than adding to the stack-up height of (especially) the tubing spool.

The modular unit comprises a carrier ring 30. The carrier ring 30 has a generally cylindrical inside surface 308 and a generally cylindrical outside surface 310. A coupling element 20 is carried by the carrier ring. The coupling element has a longitudinal axis which is generally radially positioned with respect to the longitudinal axis of the carrier ring. The coupling element has an inner end and an outer end and the outer end has a sealing face. A carrier body 50 having a generally cylindrical outside surface is positioned coaxially inside of the carrier ring 30. The generally cylindrical outside surface of the carrier body is adjacent to the generally cylindrical inside surface of the carrier ring. A means 121 is provided for radially moving the coupling element in the carrier ring responsive to relative longitudinal movement between the carrier ring and the carrier body.

The means 212 for radially moving the coupling element preferably includes a sliding actuator cam 35 positioned adjacent to the inner end of the coupling element 20 and a mounting means 105 associated with the sliding actuator cam and the carrier body for slidably mounting the sliding actuator cam 35 to the carrier body 50. Preferably, there is provided a mounting means 95 for slidably mounting the carrier ring to the carrier body in a fixed rotational orientation.

METHOD TO USE

According to certain aspects of the invention, there is provided a method for establishing a line connection across a first tubular member sidewall. A carrier ring is provided which is concentrically positioned in the first tubular member. An annulus is defined between the carrier ring and the first tubular member. A line coupling element is carried by the carrier ring. The line coupling element has a longitudinal axis which is generally radially directed with respect to a longitudinal axis of the carrier ring. The line coupling element has an outer end which defines a first sealing face. A mean is provided for defining a generally radially extending passage through the sidewall of the first tubular member with a second sealing face being defined at an inner end of the passage. The second sealing face is for sealingly contacting a respective first sealing face of the coupling element. A means is provided for urging the sealing face of the first coupling element and the sealing face at the inner end of the passage together in response to relative longitudinal movement between the first tubular member and the means for urging.

The method is especially well suited for establishing a radial line connection across a spool body. A carrier ring assembly formed by a carrier ring with a carrier body is concentrically mounted in the spool body. An annulus is defined between the carrier ring and the spool body. At least one first coupling means is carried by the carrier ring. Each coupling means has an outer end forming a first sealing face. A like number of second coupling elements are provided in the form of radial passages in the spool body. The inner ends of the passages form second sealing faces. A means is provided for radially urging the first coupling means towards the radial passages in response to relative longitudinal movement between the spool body and the carrier body. The reactive longitudinal movement between the carrier body and the spool body causes a sealing engagement between said first and second sealing faces. In a further embodiment, the method comprises providing means for withdrawing said first coupling means from sealing engagement with said radial passages. In a still further embodiment, the method comprises providing means to align the first and second sealing faces.

What is claimed is:

1. A coupling element having a first end, a second end, an outer surface, and a longitudinal axis extending between the first end and the second end, the first end of the coupling element defines a sealing surface which extends normally to the longitudinal axis, and the outer surface defines a cam follower surface forming an angle in the range of from about 2 to about 10 degrees with respect to the longitudinal axis;

wherein the second end defines the cam follower surface and the coupling element defines a passage extending from the sealing surface to the outer surface.

2. A coupling element as in claim 1 wherein the outer surface further defines at least one second cam follower surface forming an angle in the range of about 10 degrees to about 45 degrees with respect to the longitudinal axis.

3. A coupling element as in claim 2 wherein the outer surface is cylindrically shaped with a circumferentially extending groove and the second cam follower surface is formed by a wall of the groove.

4. A coupling element as in claim 1 wherein the coupling element has a valve seat positioned in the passage adjacent to the sealing surface, said valve seat facing away from the sealing surface, said coupling element further comprising a valve element positioned in a generally longitudinally extending portion of the passage adjacent to the sealing surface, said valve element having a valve face to sealingly contact the valve seat; and means for biasing the valve element toward the valve seat.

5. A coupling element as in claim 4 wherein the valve element has a first end and a second end and the valve face is positioned between the first end and the second end, the second end of the valve element protruding from the first end of the coupling element when the valve face of the valve element is in sealing contact with the valve seat.

6. A coupling element as in claim 1 further comprising a plug positioned at the second end.

7. A coupling element as in claim 6 wherein the passage opens onto a side surface of the coupling element, said element further comprising a tubing connected to said passage at said side surface.

8. A coupling element as in claim 6 wherein the sealing surface is planar.

9. A coupling element as in claim 1 further defining a plurality of grooves on the sealing surface concentrically spaced around an inlet end of the passage.

10. A coupling element as in claim 9 further comprising a plurality of seal elements positioned in the plurality of concentrically spaced grooves, one seal element per groove.

11. Apparatus comprising a tubular member having a generally cylindrical inside surface and an outside surface and a longitudinal axis;

a carrier ring having a generally cylindrical inside surface and a generally cylindrical outside surface and a longitudinal axis positioned coaxially in the tubular member with the outside surface of the carrier ring positioned adjacent to the inside surface of the tubular member;

a first coupling element carried in the carrier ring having a first end and a second end and defining a passage extending away from the second end, said first coupling element defining a valve seat positioned in the passage adjacent to the second end and facing away from the second end; a second coupling element having a first end and a second end, said second coupling element defining a passage extending away from the second end and further defining a landing surface for a valve body at the second end;

a valve element positioned in the passage near the first end of the first coupling element, said valve element having a first end and a second end and a valve face positioned between the first end and the second end which faces the first end of the first coupling element, the second end of the valve body being in contact with the valve body land on the second coupling element to hold the valve face off of the valve seat;

means associated with the first coupling element for biasing the valve body toward the valve body land and the first coupling element away from the second coupling element, and means associated with the first coupling element and the second coupling element for urging the first coupling element into contact with the second coupling element;

wherein the means for urging includes a carrier body having a generally cylindrical outside surface positioned coaxially inside of the carrier ring with the generally cylindrical outside surface of the carrier body positioned adjacent to the generally cylindrical inside surface of the carrier ring.

12. Apparatus comprising a coupling element having an exterior surface, a first end, a second end, and a longitudinal axis extending between the first end and the second end, said coupling element defining a passage having a first diameter extending from the first end along the longitudinal axis, wherein the exterior surface at said second end of the coupling element defines a cam follower surface, said coupling element having a valve seat facing the second end positioned in the passage adjacent to the first end, a valve element positioned in the passage adjacent to the sealing surface, said valve element having a valve face to sealingly contact the valve seat and a nipple having a second diameter which is smaller than the first diameter extending past the valve face to protrude from the first end of the coupling element when the valve face is positioned against the valve seat; and means associated with the valve element and the coupling element for biasing the valve face toward the valve seat.

* * * * *